US012726274B2

(12) United States Patent
Liu et al.

(10) Patent No.: US 12,726,274 B2
(45) Date of Patent: Sep. 1, 2026

(54) OPTICAL RELAY DEVICE AND SIGNAL TRANSMISSION SYSTEM

(71) Applicant: BOE TECHNOLOGY GROUP CO., LTD., Beijing (CN)

(72) Inventors: Yuehua Liu, Beijing (CN); Qiuyun Tan, Beijing (CN); Biqi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 207 days.

(21) Appl. No.: 18/579,323

(22) PCT Filed: May 25, 2022

(86) PCT No.: PCT/CN2022/095036

§ 371 (c)(1),
(2) Date: Jan. 12, 2024

(87) PCT Pub. No.: WO2023/225915

PCT Pub. Date: Nov. 30, 2023

(65) Prior Publication Data

US 2024/0348339 A1 Oct. 17, 2024

(51) Int. Cl.
*H04B 10/297* (2013.01)

(52) U.S. Cl.
CPC .................................. *H04B 10/297* (2013.01)

(58) Field of Classification Search
CPC ........ H04B 10/297; H04B 7/145; H04B 1/00; H04B 13/02; H04B 14/02; H04B 15/02;
(Continued)

(56) References Cited

U.S. PATENT DOCUMENTS

2004/0007969 A1* 1/2004 Lu ........................ H10K 50/858 313/504
2006/0062515 A1 3/2006 Mahbobi
(Continued)

FOREIGN PATENT DOCUMENTS

CN 103208741 A 7/2013
CN 103222073 A 7/2013
(Continued)

OTHER PUBLICATIONS

Chen Sun et al., "A Monolithically-Integrated Chip-to-Chip Optical Link in Bulk CMOS," Jan. 19, 2015, IEEE Journal of Solid-State Circuits, vol. 50, No. 4, Apr. 2015, pp. 828-837.*
(Continued)

*Primary Examiner* — Omar S Ismail
(74) *Attorney, Agent, or Firm* — Arch & Lake LLP

(57) ABSTRACT

An optical relay device includes a substrate, and a first transmission module and a second transmission module that are provided on the substrate. The substrate has a first side and a second side opposite to each other in a direction perpendicular to the substrate. The first transmission module and the second transmission module both include at least one light emitting unit and at least one light receiving unit. The light emitting unit includes at least one light emitter. The light receiving unit includes at least one light receiver. Optical paths of light receiving units and optical paths of light emitting units are provided in one-to-one correspondence in the direction perpendicular to the substrate, and the light receiving unit and the light emitting unit that are corresponding to each other form a signal transmission channel.

18 Claims, 12 Drawing Sheets

(58) Field of Classification Search

CPC ........ H04B 17/10; H04B 17/30; H04B 17/20; H04B 15/04; H04B 10/80; H04B 10/85; H04B 10/60; H04B 10/50; H04B 10/40; H04B 10/29; H04B 10/27; H04B 10/25; H04B 10/11; H04B 10/07; H04B 10/03; H04B 10/00; H04B 7/24; H04B 7/02; H04B 7/14; H04B 7/15; H04B 7/155; H04B 7/185; H04B 7/204; H04B 7/00; H04B 5/20; H04B 5/70; H04B 5/40; H04B 3/54; H04B 3/04; H04B 3/20; H04B 3/32; H04B 3/36; H04B 3/46; H04B 1/69; H04B 1/707; H04B 1/7163; H04B 1/713; H04B 1/62; H04B 1/64; H04B 1/3816; H04B 1/3827; H04B 1/40; H04B 1/10; H04B 1/16; H04B 1/06; H04B 1/03; H04B 1/02; H04B 17/40; H04B 17/00

See application file for complete search history.

(56) References Cited

U.S. PATENT DOCUMENTS

| | | | | |
|---|---|---|---|---|
| 2007/0182324 | A1* | 8/2007 | Richardson | H10K 59/173<br>313/512 |
| 2012/0217501 | A1* | 8/2012 | Takayama | H10D 86/0214<br>257/E29.273 |
| 2016/0047643 | A1* | 2/2016 | Yuan | H01S 5/4006<br>398/25 |
| 2017/0064831 | A1* | 3/2017 | Noguchi | H05K 1/117 |
| 2018/0294866 | A1* | 10/2018 | Ashworth | H04B 7/15507 |
| 2020/0049872 | A1* | 2/2020 | Peng | G02B 27/283 |
| 2020/0336210 | A1* | 10/2020 | Khatibzadeh | H04B 10/61 |
| 2021/0011363 | A1* | 1/2021 | Guo | G03B 33/08 |
| 2021/0091847 | A1* | 3/2021 | Ho | H01Q 15/02 |
| 2022/0101801 | A1* | 3/2022 | Zhang | G09G 3/342 |
| 2022/0397862 | A1* | 12/2022 | Karafin | G02B 30/27 |
| 2023/0028746 | A1* | 1/2023 | Yang | G09G 3/3426 |
| 2023/0088828 | A1* | 3/2023 | Liu | H10W 90/00<br>257/82 |
| 2024/0170628 | A1* | 5/2024 | Liu | H10H 20/857 |

FOREIGN PATENT DOCUMENTS

| | | | |
|---|---|---|---|
| CN | 104518835 | A | 4/2015 |
| CN | 105720129 | A | 6/2016 |
| CN | 105812057 | A | 7/2016 |
| CN | 102624452 | B | 6/2017 |
| CN | 107004734 | A | 8/2017 |
| CN | 109361463 | A | 2/2019 |
| CN | 109478900 | A | 3/2019 |
| CN | 111149141 | A | 5/2020 |
| JP | 2009153117 | A | 7/2009 |
| JP | 2015522221 | A | 8/2015 |
| WO | 2021061447 | A1 | 4/2021 |
| WO | 2022050690 | A1 | 3/2022 |

OTHER PUBLICATIONS

Iskender Haydaroglu et al.,"Optically Powered Optical Transmitter Using a Single Light-Emitting Diode," Apr. 5, 2017,IEEE Transactions on Circuits and Systems—I: Regular Papers, vol. 64, No. 8, Aug. 2017, pp. 2003-2011.*

Laurent Schares et al.,"Terabus: Terabit/Second-Class Card-Level Optical Interconnect Technologies," Oct. 18, 2005, IEEE Journal of Selected Topics in Quantum Electronics, vol. 12, No. 5, Sep. /Oct. 2006, pp. 1032-1037.*

Written Opinion Issued in PCT Application No. PCT/CN2022/095036 dated Oct. 31, 2022 with English translation, (4p).

International Search Report of PCT/CN2022/095036 dated Oct. 31, 2022 with English translation, (4p).

CNOA issued in Application No. 202280001418.7 dated Mar. 24, 2026 with English translation, (18p).

* cited by examiner

OPTICAL RELAY DEVICE AND SIGNAL TRANSMISSION SYSTEM

CROSS-REFERENCE TO RELATED APPLICATION

The present application is the U.S. National Stage of International Application No. PCT/CN2022/095036, filed on May 25, 2022, the contents of which are incorporated herein by reference in their entireties for all purposes.

TECHNICAL FIELD

The present disclosure relates to the technical field of communications, and in particular to an optical relay device and a signal transmission system.

BACKGROUND

The 5th Generation (5G) signal has a high frequency and short wavelength. When the 5G signal passes through glass and other obstacles, the loss is large and the signal attenuation is extremely fast. This makes the signal strength of 5G signal weak when it reaches indoor through glass, which cannot meet the demand for high-speed indoor internet access. This is an urgent problem that needs to be solved in the promotion process of 5G communication.

The above information disclosed in the background is only intended to enhance the understanding of the background of the present disclosure, and therefore may include information that does not constitute prior art known to those skilled in the art.

SUMMARY

An object of the present disclosure is to provide an optical relay device and a signal transmission system, to increase the signal transmission rate and complete the high-speed relay of a signal.

In order to achieve the above object, the present disclosure adopts the following technical solutions.

According to a first aspect of the present disclosure, there is provided an optical relay device. The optical relay device includes a substrate and a first transmission module and a second transmission module that are provided on the substrate.

The substrate has a first side and a second side opposite to each other in a direction perpendicular to the substrate.

The first transmission module and the second transmission module both include at least one light emitting unit and at least one light receiving unit. The light emitting unit is configured to convert an electrical signal into an optical signal. The light receiving unit is configured to convert an optical signal into an electrical signal. The light emitting unit includes at least one light emitter, and when the light emitting unit includes at least two light emitters, the light emitters in the light emitting unit are connected in parallel. The light receiving unit includes at least one light receiver, and when the light receiving unit includes at least two light receivers, the light receivers in the light receiving unit are connected in parallel.

The light emitting unit in the first transmission module is provided on the first side of the substrate, and the light receiving unit in the first transmission module is provided on the second side of the substrate.

The light emitting unit in the second transmission module is provided on the second side of the substrate, and the light receiving unit in the second transmission module is provided on the first side of the substrate.

Optical paths of light receiving units and optical paths of light emitting units are provided in one-to-one correspondence in the direction perpendicular to the substrate, and the light receiving unit and the light emitting unit that are corresponding to each other form a signal transmission channel.

In an exemplary embodiment of the present disclosure, the optical relay device further includes a first conductive layer and a second conductive layer.

The first conductive layer includes a first power supply end and a plurality of interconnected first connection units connected to the first power supply end.

The second conductive layer includes a second power supply end and a plurality of interconnected second connection units connected to the second power supply end.

The light emitter is provided with a first pole and a second pole, the first pole of the light emitter in the light emitting unit is connected to the first connection unit, and the second pole of the light emitter in the light emitting unit is connected to the second connection unit.

The light emitting units, the first connection units and the second connection units are in one-to-one correspondence in a connecting relationship.

The first conductive layer, the second conductive layer, and the light emitting unit correspondingly connected to the first conductive layer and the second conductive layer are provided on a same side of the substrate.

In an exemplary embodiment of the present disclosure, the optical relay device further includes a third conductive layer and a fourth conductive layer.

The third conductive layer includes a first power supply end and a plurality of interconnected third connection units connected to the first power supply end.

The fourth conductive layer includes a second power supply end and a plurality of interconnected fourth connection units connected to the second power supply end.

The light receiver is provided with a first pole and a second pole, the first pole of the light receiver in the light receiving unit is connected to the third connection unit, and the second pole of the light receiver in the light receiving unit is connected to the fourth connection unit.

The light receiving units, the third connection units and the fourth connection units are in one-to-one correspondence in a connecting relationship.

The third conductive layer, the fourth conductive layer, and the light receiving unit correspondingly connected to the third conductive layer and the fourth conductive layer are provided on a same side of the substrate.

In an exemplary embodiment of the present disclosure, the first conductive layer further includes a first connection bus, where the first connection bus extends along a first direction, and the plurality of first connection units are connected to the first power supply end through the first connection bus.

The first connection unit includes a first trunk and a plurality of first branches connected to the first trunk, where the first trunk extends along a second direction, the second direction is perpendicular to the first direction, the first connection unit is connected to a side of the first connection bus in the second direction through the first trunk, and the plurality of first connection units are arranged at intervals along the first direction.

The first pole of the light emitter in the light emitting unit is connected to the first branch.

In an exemplary embodiment of the present disclosure, the second conductive layer further includes a second connection bus, where the second connection bus extends along the first direction and is located on a side of the first connection unit away from the first connection bus, and the plurality of second connection units are connected to the second power supply end through the second connection bus.

The second connection unit includes a second trunk and a plurality of second branches connected to the second trunk, where the second trunk extends along the second direction, the second connection unit is connected to a side of the second connection bus close to the first connection unit through the second trunk, and the plurality of second connection units are arranged at intervals along the first direction.

The second pole of the light emitter in the light emitting unit is connected to the second branch.

In an exemplary embodiment of the present disclosure, the third conductive layer further includes a third connection bus, where the third connection bus extends along a first direction, and the plurality of third connection units are connected to the first power supply end through the third connection bus.

The third connection unit includes a third trunk and a plurality of third branches connected to the third trunk, where the third trunk extends along a second direction, the second direction is perpendicular to the first direction, the third connection unit is connected to a side of the third connection bus in the second direction through the third trunk, and the plurality of third connection units are arranged at intervals along the first direction.

The first pole of the light receiver in the light receiving unit is connected to the third branch.

In an exemplary embodiment of the present disclosure, the fourth conductive layer further includes a fourth connection bus, where the fourth connection bus extends along the first direction and is located on a side of the third connection unit away from the third connection bus, and the plurality of fourth connection units are connected to the second power supply end through the fourth connection bus.

The fourth connection unit includes at least two fourth branches, where the fourth branch extends along the second direction, the fourth branch is connected to a side of the fourth connection bus close to the third connection unit, and the plurality of fourth connection units are arranged at intervals along the first direction.

The second pole of the light receiver in the light receiving unit is connected to the fourth branch.

In an exemplary embodiment of the present disclosure, the optical relay device further includes a first conductive layer and a second conductive layer.

The first conductive layer includes a plurality of first connection units arranged at intervals, and the first connection unit includes a first power supply end.

The second conductive layer includes a plurality of second connection units arranged at intervals, and the second connection unit includes a second power supply end.

The light emitter is provided with a first pole and a second pole, the first pole of the light emitter in the light emitting unit is connected to the first connection unit, and the second pole of the light emitter in the light emitting unit is connected to the second connection unit.

The light emitting units, the first connection units and the second connection units are in one-to-one correspondence in a connecting relationship.

The first conductive layer, the second conductive layer, and the light emitting unit correspondingly connected to the first conductive layer and the second conductive layer are provided on a same side of the substrate.

In an exemplary embodiment of the present disclosure, the optical relay device further includes a third conductive layer and a fourth conductive layer.

The third conductive layer includes a plurality of third connection units arranged at intervals, and the third connection unit includes a first power supply end.

The fourth conductive layer includes a plurality of fourth connection units arranged at intervals, and the fourth connection unit includes a second power supply end.

The light receiver is provided with a first pole and a second pole, the first pole of the light receiver in the light receiving unit is connected to the third connection unit, and the second pole of the light receiver in the light receiving unit is connected to the fourth connection unit.

The light receiving units, the third connection units and the fourth connection units are in one-to-one correspondence in a connecting relationship.

The third conductive layer, the fourth conductive layer, and the light receiving unit correspondingly connected to the third conductive layer and the fourth conductive layer are provided on a same side of the substrate.

In an exemplary embodiment of the present disclosure, the light emitter includes a first pole, a first charge transport layer, a light emitting layer, a second charge transport layer, and a second pole.

The first charge transport layer, the light emitting layer and the second charge transport layer are provided sequentially along a direction away from the substrate.

The first pole is connected to the first charge transport layer, and the second pole is connected to the second charge transport layer.

In an exemplary embodiment of the present disclosure, the light emitter includes a first reflecting mirror, an oxidation confinement layer, an active layer, a second reflecting mirror, a first pole, and a second pole.

The first reflecting mirror, the oxidation confinement layer, the active layer, and the second reflecting mirror are provided sequentially along a direction substantially perpendicular to the substrate. The oxidation confinement layer includes an unoxidized zone and an oxidation zone provided peripheral to the unoxidized zone.

The first pole is connected to the first reflecting mirror, and the second pole is connected to the second reflecting mirror.

In an exemplary embodiment of the present disclosure, the light receiver includes a first pole, a first semiconductor layer, a photoelectric conversion layer, a second semiconductor layer, and a second pole.

The first semiconductor layer, the photoelectric conversion layer and the second semiconductor layer are provided sequentially along a direction away from the substrate.

The first pole is connected to the first semiconductor layer, and the second pole is connected to the second semiconductor layer.

In an exemplary embodiment of the present disclosure, the light receiver further includes an avalanche layer that is provided between the photoelectric conversion layer and the second semiconductor layer.

In an exemplary embodiment of the present disclosure, both the first transmission module and the second transmission module further include a laser driver and a trans-impedance amplifier.

The laser driver is configured to receive an electrical signal converted from a microwave signal and transmit the electrical signal to the light emitting unit for driving the light emitting unit to emit the optical signal.

The light receiving unit is configured to receive the optical signal emitted by the light emitting unit, convert the optical signal into a current signal, and then output the current signal.

The trans-impedance amplifier is configured to receive the current signal output by the light receiving unit, convert the current signal into a voltage signal, and then amplify and output the voltage signal.

In an exemplary embodiment of the present disclosure, the microwave signal is a 5th generation (5G) signal.

According to a second aspect of the present disclosure, there is provided a signal transmission system including a communication station and the optical relay device as described in the first aspect.

The communication station includes a first communication station and a second communication station for sending and receiving an electrical signal.

The optical relay device relays the electrical signal output by the first communication station to the second communication station, and relays the electrical signal output by the second communication station to the first communication station.

According to a third aspect of the present disclosure, there is provided a method for manufacturing an optical relay device. The method includes:

- providing a substrate, where the substrate has a first side and a second side opposite to each other in a direction substantially perpendicular to the substrate; and
- forming a first transmission module and a second transmission module on the substrate; where the first transmission module and the second transmission module both includes at least one light emitting unit and at least one light receiving unit, where the light emitting unit is configured to convert an electrical signal into an optical signal, the light receiving unit is configured to convert an optical signal into an electrical signal; the light emitting unit includes at least one light emitter, and when the light emitting unit includes at least two light emitters, the light emitters in the light emitting unit are connected in parallel; the light receiving unit includes at least one light receiver, and when the light receiving unit includes at least two light receivers, the light receivers in the light receiving unit are connected in parallel; where
- the light emitting unit in the first transmission module is provided on the first side of the substrate, and the light receiving unit in the first transmission module is provided on the second side of the substrate; and
- the light emitting unit in the second transmission module is provided on the second side of the substrate, and the light receiving unit in the second transmission module is provided on the first side of the substrate; and
- optical paths of light receiving units and optical paths of light emitting units are provided in one-to-one correspondence in the direction perpendicular to the substrate, and the light receiving unit and the light emitting unit that are corresponding to each other form a signal transmission channel.

The optical relay device provided in the present disclosure includes the first transmission module and the second transmission module. The first transmission module completes the transmission of the signal from the first side to the second side of the substrate, and the second transmission module may complete the transmission of the signal from the second side to the first side of the substrate, thereby completing a bi-directional transmission of the signal, which is helpful to satisfy the transmission of indoor signals and outdoor signals. In addition, the first transmission module and the second transmission module include at least one light emitting unit and at least one light receiving unit, the light emitting unit includes at least one light emitter, and the light receiving unit includes at least one light receiver, which facilitates to increase the signal transmission rate and complete a high-speed relay of a signal.

BRIEF DESCRIPTION OF THE DRAWINGS

The above and other features and advantages of the present disclosure will become more apparent by describing in detail the exemplary embodiments thereof with reference to the accompanying drawings.

Figure 1:
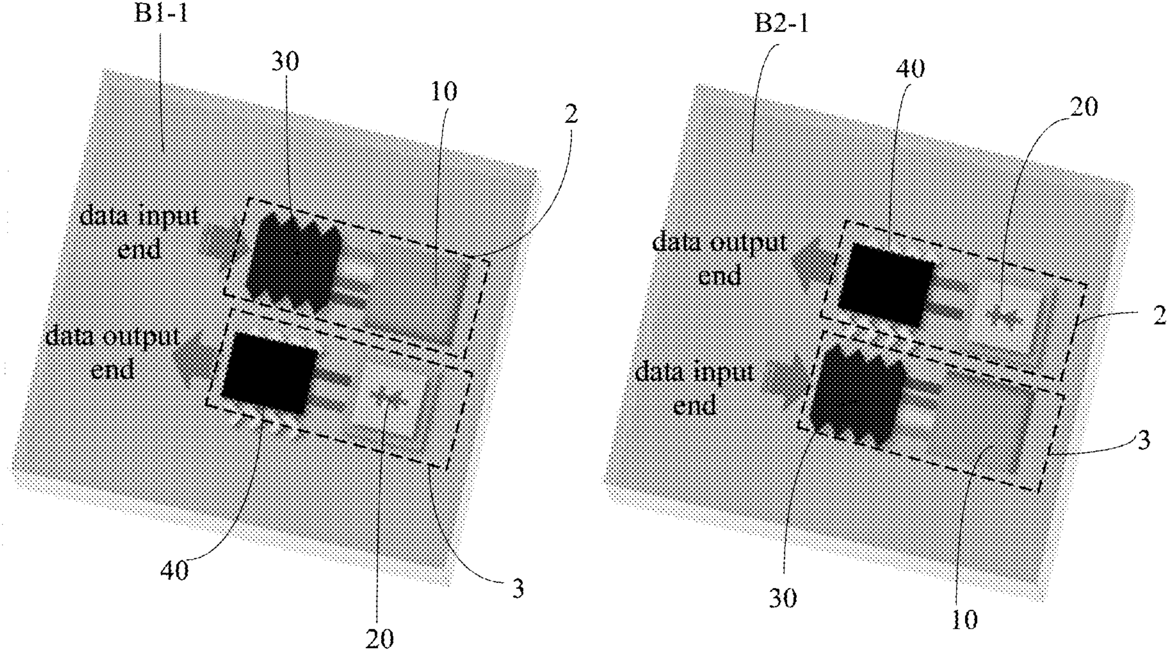
FIG. 1 is a schematic diagram of structures of a first side and a second side of an optical relay device in an exemplary embodiment of the present disclosure.

The reference numerals of the main elements in the figures are described as follows:

01—optical relay device; 1—substrate; b1—first side; b2—second side; 2—first transmission module; 3—second transmission module; 10—light emitting unit; 100—light emitter; 110—first conductive layer; V1—first power supply end; 111—first connection unit; 1111—first trunk; 1112—first branch; 1113—first connection branch; 112—first connection bus; Y—first direction; X—second direction; 120—second conductive layer; V2—second power supply end; 121—second connection unit; 1211—second trunk; 1212—second branch; 1213—second connection branch; 122—second connection bus; 20—light receiving unit; 200—light receiver; 210—third conductive layer; 211—third connection unit; 2111—third trunk; 2112—third branch; 212—third connection bus; 2113—third connection branch; 220—fourth conductive layer; 221—fourth connection unit; 222—fourth connection bus; 2212—fourth branch; 101—first pole; 102—first charge transport layer; 103—light emitting layer; 104—second charge transport layer; 105—second pole; 1011—first reflecting mirror; 1012—oxidation confinement layer; 12*a*—oxidation zone; 12*b*—unoxidized zone; 1013—active layer; 1014—second reflecting mirror; 30—laser driver; 40—trans-impedance amplifier; L1—first connection line; L2—second connection line; L3—third connection line; L4—fourth connection line; 202—first semiconductor layer; 203—photoelectric conversion layer; 204—second semiconductor layer; 205—avalanche layer; 2051—absorption layer; 2052—charge layer; 50—first communication station; 60—second communication station; 70—first signal processing portion; 80—second signal processing portion; 001—underlayment; 002—transparent conductive layer; 003—insulating film; 004—base plate.

DETAILED DESCRIPTION

Example embodiments are now described more fully with reference to the accompanying drawings. However, the example embodiments can be implemented in various forms and should not be construed as limited to the examples set forth herein. Rather, providing these embodiments makes the disclosure more comprehensive and complete, and conveys the concepts of the example embodiments comprehensively to those skilled in the art. The described features, structures, or characteristics may be combined in any suitable manner in one or more embodiments. In the following description, many specific details are provided to give a full understanding of the embodiments of the present disclosure.

In the accompanying drawings, areas and thicknesses of layers may be exaggerated for clarity. The same reference numeral in the accompanying drawings represents the same or similar structures, and therefore their detailed description will be omitted.

The described features, structures or characteristics may be combined in one or more embodiments in any suitable manner. In the following description, many specific details are provided to give a full understanding of the embodiments of the present disclosure. However, those skilled in the art will realize that it is possible to practice the technical solutions of the present disclosure without one or more of the described particular details, or that other methods, components, materials, etc., may be employed. In other instances, well-known structures, materials, or operations are not shown or described in detail to avoid obscuring the main technical ideas of the present disclosure.

When a structure is "on" other structures, it may refer to a structure being integrally formed on other structures, or a structure being "directly" set on other structures, or a structure being "indirectly" set on other structures through another structure.

The terms "a", "one", "the/said" are used to indicate the presence of one or more elements/components, etc. The terms "include" and "have" are used to indicate open-ended inclusion and mean that there may be additional elements/components/etc., in addition to the listed elements/components/etc. The terms "first", "second", etc. are only used as marks and are not intended to limit the number of their objects.

With the development of 1G, 2G, 3G, 4G, and 5G, the frequency of radio waves used is getting higher and higher. The frequency range of 5G can be divided into two types: one is below 6 GHz, which is not much different from the current 2G/3G/4G, and the other is above 24 GHz. The higher the frequency, the richer the frequency resources that can be used. The richer the frequency resources, the higher the transmission rate that can be achieved. The biggest problem with communications that use high frequency bands is that the transmission distance is greatly reduced and the coverage capability is greatly reduced. The number of 5G base stations needed to cover the same area will greatly exceed that of 4G. At present, the coverage of 5G signals is relatively narrower, and 5G signals, due to their high frequency and short wavelength, suffer a high loss when passing through glass and other obstacles, and the signal attenuation is extremely fast. This makes the signal strength of 5G signal weak when it reaches indoor through glass, and cannot meet the demand for indoor high-speed internet access.

As shown in FIGS. 1 to 9, an optical relay device 01 is provided in an embodiment of the present disclosure. The optical relay device 01 includes a substrate 1, and a first transmission module 2 and a second transmission module 3 that are provided on the substrate 1. The substrate 1 has a first side B1 and a second side B2 opposite to each other in a direction perpendicular to the substrate 1. The first transmission module 2 and the second transmission module 3 both include at least one light emitting unit 10 and at least one light receiving unit 20, the light emitting unit 10 is configured to convert an electrical signal into an optical signal, and the light receiving unit 20 is configured to convert an optical signal into an electrical signal. The light emitting unit 10 includes at least one light emitter 100, and when the light emitting unit 10 includes at least two light emitters 100, the light emitters 100 in the light emitting unit 10 are connected in parallel. The light receiving unit 20 includes at least one light receiver 200, and when the light receiving unit 20 includes at least two light receivers 200, the light receivers 200 in the light receiving unit 20 are connected in parallel. The light emitting unit 10 in the first transmission module 2 is provided on the first side B1 of the substrate 1, and the light receiving unit 20 in the first transmission module 2 is provided on the second side B2 of the substrate 1. The light emitting unit 10 in the second transmission module 3 is provided on the second side B2 of the substrate 1, and the light receiving unit 20 in the second transmission module 3 is provided on the first side B1 of the substrate 1. Optical paths of the light receiving units 20 and optical paths of the light emitting units 10 are provided in one-to-one correspondence in a direction substantially perpendicular to the substrate 1, and the light receiving unit 20 and the light emitting unit 10 that are corresponding to each other form a signal transmission channel.

The optical relay device 01 provided in the present disclosure includes the first transmission module 2 and the second transmission module 3. The first transmission module 2 completes the transmission of the signal from the first side B1 to the second side B2 of the substrate 1, and the second transmission module 3 may complete the transmission of the signal from the second side B2 to the first side B1 of the substrate 1, thereby completing a bi-directional transmission of the signal, which is helpful to satisfy the transmission of indoor signals and outdoor signals. In addition, the first transmission module 2 and the second transmission module 3 include at least one light emitting unit 10 and at least one light receiving unit 20, the light emitting unit 10 includes at least one light emitter 100, and the light receiving unit 20 includes at least one light receiver 200, which facilitates to increase the signal transmission rate and complete a high-speed relay of a signal.

The optical relay device 01 of present disclosure facilitates to achieve a high-speed relay of microwave signals such as 5G signals, and solve the coverage problem of 5G signals. The substrate 1 in the device may be glass of a mobile tool such as an automobile, an aircraft, and a ship, or may be glass of a building such as an interior, to achieve a real-time reception of 5G signals in outdoor mobile scenes and within doors.

The components of the optical relay device 01 provided by the embodiments of the present disclosure are described in detail below in conjunction with the accompanying drawings.

As shown in FIGS. 1 to 9, the present disclosure provides an optical relay device 01. The optical relay device 01 includes a substrate 1, and a first transmission module 2 and a second transmission module 3 that are provided on the substrate 1. The first transmission module 2 and the second transmission module 3 both include at least one light emitting unit 10 and at least one light receiving unit 20. The light emitting unit 10 may convert an electrical signal into an optical signal, and the light receiving unit 20 may convert an optical signal into an electrical signal. An electro-optic-electro conversion is achieved by the light emitting unit 10 and the light receiving unit 20, which facilitates to achieve a high-speed relay of 5G signals within doors, automobile, and other vehicles.

In some embodiments of the present disclosure, the substrate 1 may be a glass substrate, which in a practical application may be the glass of a mobile tool such as an automobile, an aircraft, and a ship, or may be the glass of a building such as an office building and a residential building, to achieve real-time reception of 5G signals in an outdoor mobile scene and within doors. The substrate 1 has a first side B1 and a second side B2 opposite to each other in a direction substantially perpendicular to the substrate 1. In a practical application environment, the first side B1 and the second side B2 of the substrate 1 may be understood as an inner side and an outer side of the glass of the mobile tool, and an inner side and an outer side of the glass of the building. The first side B1 may be the inner side or the outer side, and the corresponding second side B2 may be the outer side or the inner side.

The light emitting unit 10 in the first transmission module 2 is provided on the first side B1 of the substrate 1, and the light receiving unit 20 in the first transmission module 2 is provided on the second side B2 of the substrate 1. The first transmission module 2 can complete the transmission of the signal from the first side B1 to the second side B2 of the substrate 1. For example, if the substrate 1 is the glass of a residential building, the first side B1 of the substrate 1 is the outer side of the glass, i.e., outdoor, and the second side B2 of the substrate 1 is the inner side of the glass, i.e., indoor, then the first transmission module 2 can complete the transmission of signals from outdoor to indoor. The light emitting unit 10 in the second transmission module 3 is provided on the second side B2 of the substrate 1, and the light receiving unit 20 in the second transmission module 3 is provided on the first side B1 of the substrate 1. The second transmission module 3 can complete the transmission of signals from the second side B2 to the first side B1 of the substrate 1. As above, the substrate 1 is the glass of the residential building, the first side B1 of the substrate 1 is the outer side of the glass, i.e., outdoor, and the second side B2 of the substrate 1 is the inner side of the glass, i.e., indoor, and then the second transmission module 3 can complete the transmission of signals from indoor to outdoor.

The light emitting unit 10 includes at least one light emitter 100, and when the light emitting unit includes at least two light emitters 100, the light emitters 100 in the light emitting unit 10 are connected in parallel. Similarly, the light receiving unit 20 includes at least one light receiver 200, and when the light receiving unit 20 includes at least two light receivers 200, the light receivers 200 in the light receiving unit 20 are connected in parallel. When the light emitting unit 10 and the light receiving unit 20 are connected in parallel respectively, it facilitates to enhance the reliability of the signal transmission and guarantee the normal use of a user.

Optical paths of the light receiving units 20 and optical paths of the light emitting units 10 are provided in one-to-one correspondence in a direction substantially perpendicular to the substrate 1, i.e., the optical path of the light receiving unit 20 and the optical path of the light emitting unit 10 are aligned in the direction substantially perpendicular to the substrate 1, and the alignment accuracy is required to be 0 um-100 um, so as to realize a bi-directional conversion of the optical signal and the electrical signal. The light receiving unit 20 and the light emitting unit 10 that are corresponding to each other form a signal transmission channel so as to complete a wireless transmission between them. The number of light emitters 100 in the light emitting unit 10 and the number of light receivers 200 in the light receiving unit 20 may be the same or different, which is not limited in the present disclosure.

In the present disclosure, the light emitting unit 10 and the light receiving unit 20 may be arranged in an array. When the number of the light emitting units 10 and the number of the light receiving units 20 are multiple, there may be a variety of connection modes. The following will explain the connection modes of the light emitting units 10 and the light receiving units 20 in the present disclosure in combination with specific embodiments.

Figure 2:
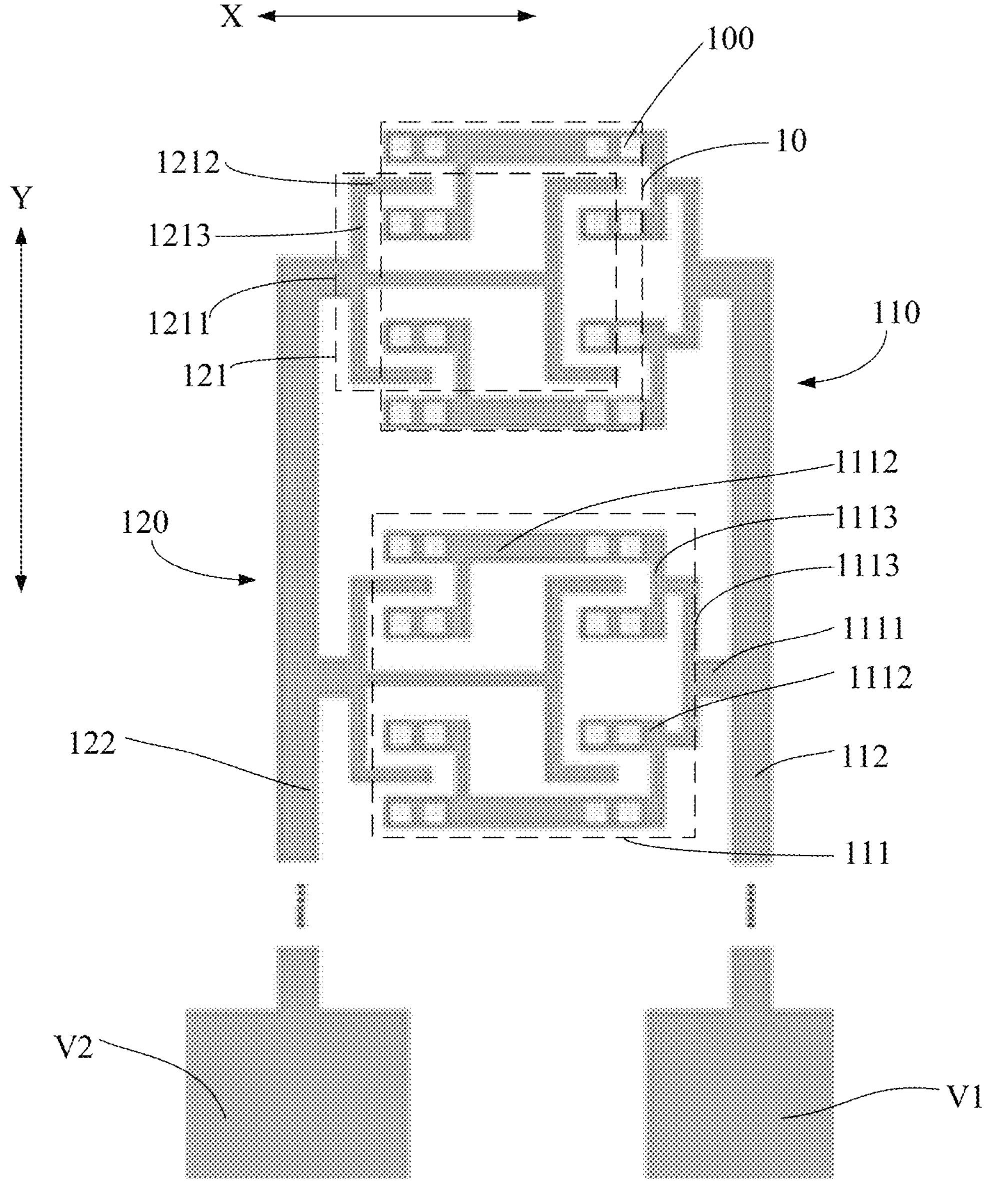
FIG. 2 is a schematic diagram of structures of a first conductive layer and a second conductive layer of an optical relay device in an exemplary embodiment of the present disclosure.
Figure 10:
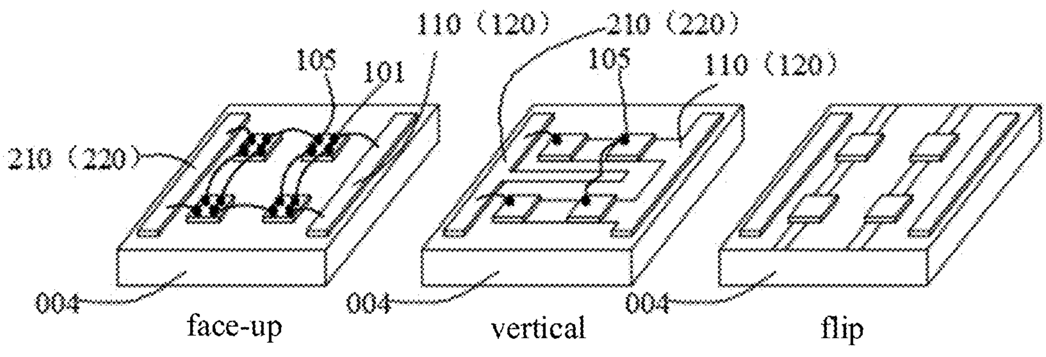
FIG. 10 is a schematic diagram of structures of a face-up structure, a vertical structure, and a flip structure.

As shown in FIGS. 1, 2, and 10, in some embodiments of the present disclosure, the optical relay device 01 further includes a first conductive layer 110 and a second conductive layer 120. The first conductive layer 110 includes a first power supply end V1 and a plurality of interconnected first connection units 111 connected to the first power supply end V1. The second conductive layer 120 includes a second power supply end V2 and a plurality of interconnected second connection units 121 connected to the second power supply end V2. The material of the first conductive layer 110 and the material of the second conductive layer 120 may be a transparent conductive material such as a metal, an alloy material, or an indium tin oxide (ITO). The light emitter 100 is provided with a first pole 101 and a second pole 105, the first pole 101 of the light emitter 100 in the light emitting unit 10 is connected to the first connection unit 111, and the second pole 105 of the light emitter 100 in the light emitting unit 10 is connected to the second connection unit 121. In FIG. 2, connection structures of the second pole 105 and the second connection unit 121 are not shown for the sake of clarity of the pattern. The first pole 101 of the light emitter 100 is connected to the first power supply end V1 through the first connection unit 111, and the second pole 105 of the light emitter 100 is connected to the second power supply end V2 through the second connection unit 121. The first power supply end V1 may provide a first voltage VDD or VSS or a data voltage, and correspondingly, the second power supply end V2 may provide a second voltage VSS or VDD or a data voltage. The light emitting units 10, the first connection units 111, and the second connection units 121 are in one-to-one correspondence in a connecting relationship. In this embodiment, the light emitting units 10, the first connection units 111 and the second connection units 121 are equal in number, and one light emitting unit 10 is connected to one first connection unit 111 and one second connection unit 121.

The first conductive layer 110, the second conductive layer 120 and the light emitting unit 10 correspondingly connected to the first conductive layer 110 and the second conductive layer 120 are provided on a same side of the substrate 1. For example, the first conductive layer 110, the second conductive layer 120, and the light emitting unit 10 are all provided on the first side B1 of the substrate 1. It should be noted herein that the first conductive layer 110 and the second conductive layer 120 may be provided in a same layer or in different layers, which is not limited in the present disclosure.

As shown in FIG. 10, the first conductive layer 110, the second conductive layer 120, and the light emitter 100 may be connected via a face-up structure, a vertical structure, and a flip structure, which may be selected according to the actual situation.

For example, in an embodiment, the first conductive layer 110 and the second conductive layer are provided in the same layer. The optical relay device 01 further includes a base plate 004 on which the first conductive layer 110 and the second conductive layer 120 are provided. As the vertical structure in FIG. 10, the first pole 101 and the second pole 105 of the light emitter 100 are distributed substantially along a direction substantially perpendicular to the base plate 004. For example, the first pole 101 is close to the base plate 004, and the second pole 105 is away from the base plate 004. In this case, the light emitter 100 may be bonded to the corresponding position of the first conductive layer 110 through a conductive adhesive and other structures, so that the first pole 101 of the light emitter 100 is connected to the corresponding first connection unit 111 through the conductive adhesive, and then the second pole 105 of the light emitter 100 is connected to the corresponding second connection unit 121 by lead welding. In this way, the connection of all light emitters 100 in the light emitting unit 10 with the first connection unit 111 and the second connection unit 121 is completed. This connection mode is completed in such manner that the first pole 101 and the second pole 105 are distributed substantially in a direction substantially perpendicular to the base plate 004, and therefore forms the vertical structure. The flip structure is that the first pole 101 and the second pole 105 are provided substantially on a side close to the base plate 004, i.e., close to the first conductive layer 110 and the second conductive layer 120. The face-up structure is that the first pole 101 and the second pole 105 are provided substantially on a side away from the base plate 004, i.e., away from the first conductive layer 110 and the second conductive layer 120. The face-up structure, the vertical structure, and the flip structure are commonly used packaging methods in this field, and will not be elaborated herein.

Continuing to refer to FIG. 2, the first conductive layer 110 and the second conductive layer 120 may have various patterns. In a specific embodiment, the first conductive layer 110 further includes a first connection bus 112. The first connection bus 112 extends along a first direction Y, and a plurality of first connection units 111 are connected to the first power supply end V1 through the first connection bus 112. The first connection unit 111 includes a first trunk 1111 and a plurality of first branches 1112 connected to the first trunk 1111. The first trunk 1111 extends along a second direction X. The second direction X is substantially perpendicular to the first direction Y The first connection unit 111 is connected to a side of the first connection bus 112 in the second direction X through the first trunk 1111, and the plurality of first connection units 111 are arranged at intervals along the first direction Y The first pole 101 of the light emitter 100 in the light emitting unit 10 is connected to the first branch 1112. The number of the first branches 1112 is multiple, and one or more light emitters 100 may be connected to one first branch 1112, which is not limited in the present disclosure. The first connection unit 111 may further include a first connection branch 1113, and the first branches 1112 may be connected to each other or to the first trunk 1111 through the first connection branch 1113. The first branches 1112 may extend along the second direction X, and the first connection branch 1113 may extend along the first direction Y In a specific embodiment, the number of the first branches 1112 in a single first connection unit 111 is six, the number of the light emitters 100 in a single light emitting unit 10 is 16, and two or four light emitters 100 may be connected to one first branch 1112. The first branch 1112 and the first connection branch 1113 may also extend along other directions, which is not limited in the present disclosure.

The second conductive layer 120 further includes a second connection bus 122. The second connection bus 122 extends along the first direction Y, and the second connection bus 122 is located on a side of the first connection unit 111 away from the first connection bus 112. A plurality of second connection units 121 are connected to the second power supply end V2 through the second connection bus 122.

The second connection unit 121 includes a second trunk 1211 and a plurality of second branches 1212 connected to the second trunk 1211. The second trunk 1211 extends along the second direction X. The second connection unit 121 is connected to a side of the second connection bus 122 close to the first connection unit 111 through the second trunk 1211, and the plurality of second connection units 121 are arranged at intervals along the first direction Y.

The second pole 105 of the light emitter 100 in the light emitting unit 10 is connected to the second branch 1212. The number of the second branches 1212 is multiple, and one or more light emitters 100 may be connected to one second branch 1212, which is not limited in the present disclosure. The second connection unit 121 may further include a second connection branch 1213. The second branches 1212 may be connected to each other or to the second trunk 1211 through the second connection branch 1213. The second branches 1212 may extend along the second direction X, and the second connection branch 1213 may extend along the first direction Y The second branch 1212 and the second connection branch 1213 may also extend along other directions, which is not limited in the present disclosure. In a specific embodiment, the number of the second branches 1212 in a single second connection unit 121 is four, the number of the light emitters 100 in a single light emitting unit 10 is 16, and four light emitters 100 may be connected to one second branch 1212.

Figure 3:
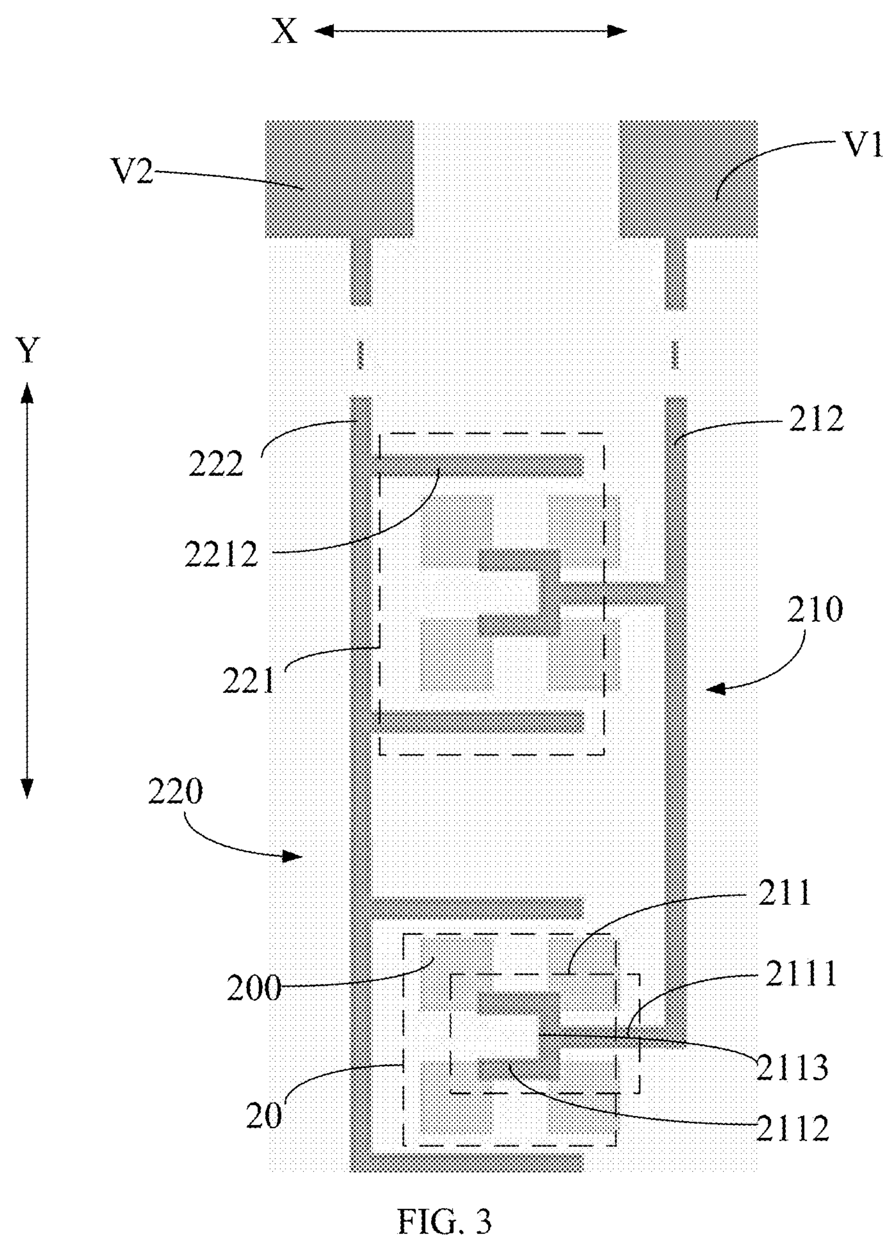
FIG. 3 is a schematic diagram of structures of a third conductive layer and a fourth conductive layer of an optical relay device in an exemplary embodiment of the present disclosure.

As shown in FIGS. 3 and 10, the optical relay device 01 further includes a third conductive layer 210 and a fourth conductive layer 220. The third conductive layer 210 includes a first power supply end V1 and a plurality of interconnected third connection units 211 connected to the first power supply end V1. The fourth conductive layer 220 includes a second power supply end V2 and a plurality of interconnected fourth connection units 221 connected to the second power supply end V2. The material of the third conductive layer 210 and the material of the fourth conductive layer 220 may be a transparent conductive material such as a metal, an alloy material, or an indium tin oxide (ITO). The light receiver 200 is provided with a first pole 101 and a second pole 105, the first pole 101 of the light receiver 200 in the light receiving unit 20 is connected to the third connection unit 211, and the second pole 105 of the light receiver 200 in the light receiving unit 20 is connected to the fourth connection unit 221. The first pole 101 of the light receiver 200 is connected to the first power supply end V1 through the third connection unit 211, and the second pole 105 of the light receiver 200 is connected to the fourth power supply end through the fourth connection unit 221. The third power supply end may provide a first voltage VDD or VSS or a data voltage, and correspondingly, the fourth power supply end may provide a second voltage VSS or VDD or a data voltage. The light receiving units 20, the third connection units 211 and the fourth connection units 221 are in one-to-one correspondence in a connecting relationship. In this embodiment, the light receiving units 20, the third connection units 211 and the fourth connection units 221 are equal in number, and one light receiving unit 20 is connected to one third connection unit 211 and one fourth connection unit 221.

The third conductive layer 210, the fourth conductive layer 220 and the light receiving unit 20 correspondingly connected to the third conductive layer 210 and the fourth conductive layer 220 are provided on a same side of the substrate 1. For example, the third conductive layer 210, the fourth conductive layer 220, and the light receiving unit 20 are all provided on the second side B2 of the substrate 1. It should be noted herein that the third conductive layer 210 and the fourth conductive layer 220 may be provided in a same layer or in different layers, which is not limited in the present disclosure. Similarly, the third conductive layer 210, the fourth conductive layer 220 and the light receiver 200 may be connected via the face-up structure, the vertical structure and the flip structure, which may be selected according to the actual situation.

The third conductive layer 210 and the fourth conductive layer 220 may have various patterns. In a specific embodiment, the third conductive layer 210 further includes a third connection bus 212. The third connection bus 212 extends along a first direction Y, and a plurality of third connection units 211 are connected to the first power supply end V1 through the third connection bus 212.

The third connection unit 211 includes a third trunk 2111 and a plurality of third branches 2112 connected to the third trunk 2111. The third trunk 2111 extends along a second direction X. The second direction X is substantially perpendicular to the first direction Y The third connection unit 211 is connected to a side of the third connection bus 212 in the second direction X through the third trunk 2111, and the plurality of third connection units 211 are arranged at intervals along the first direction Y.

The first pole 101 of the light receiver 200 in the light receiving unit 20 is connected to the third branch 2112. The number of the third branches 2112 is multiple, and one or more light receivers 200 may be connected to one third branch 2112, which is not limited in the present disclosure. The third connection unit 211 may further include a third connection branch 2113, and the third branches 2112 may be connected to each other or to the third trunk 2111 through the third connection branch 2113. The third branches 2112 may extend along the second direction X, and the third connection branch 2113 may extend along the first direction Y In a specific embodiment, the number of the third branches 2112 in a single third connection unit 211 is two, a single light receiving unit 20 includes four light receivers 200, and two light receivers 200 are connected to one third branch 2112. The third branches 2112 and the third connection branch 2113 may also extend along other directions, which is not limited in the present disclosure.

The fourth conductive layer 220 further includes a fourth connection bus 222. The fourth connection bus 222 extends along the first direction Y, and the fourth connection bus 222 is located on a side of the third connection unit 211 away from the third connection bus 212. A plurality of fourth connection units 221 are connected to the second power supply end V2 through the fourth connection bus 222.

The fourth connection unit 221 includes at least two fourth branches 2212, the fourth branches 2212 extend along the second direction X, the fourth branch 2212 is connected to a side of the fourth connection bus 222 close to the third connection unit 211, and the plurality of fourth connection units 221 are arranged at intervals along the first direction Y.

The second pole 105 of the light receiver 200 in the light receiving unit 20 is connected to the fourth branch 2212. The number of the fourth branches 2212 may be multiple, and one or more light receivers 200 may be connected to one fourth branch 2212, which is not limited in the present disclosure. In a specific embodiment, the number of fourth branches 2212 in a single fourth connection unit 221 is two, four light receivers 200 are included in a single light receiving unit 20, and two light receivers 200 are connected to one fourth branch 2212.

Figure 4:
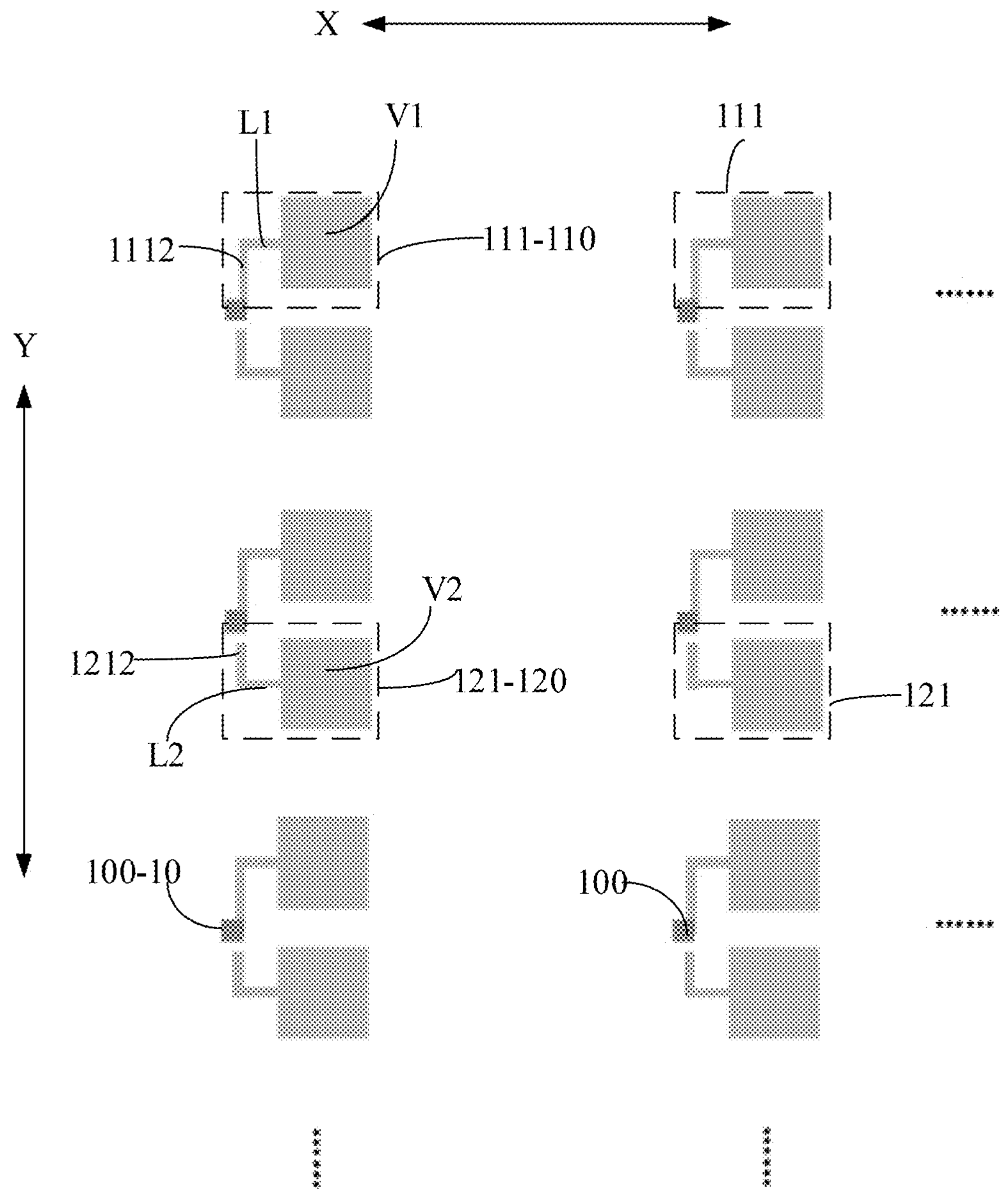
FIG. 4 is a schematic diagram of structures of a first conductive layer and a second conductive layer of an optical relay device in another exemplary embodiment of the present disclosure.
Figure 7:
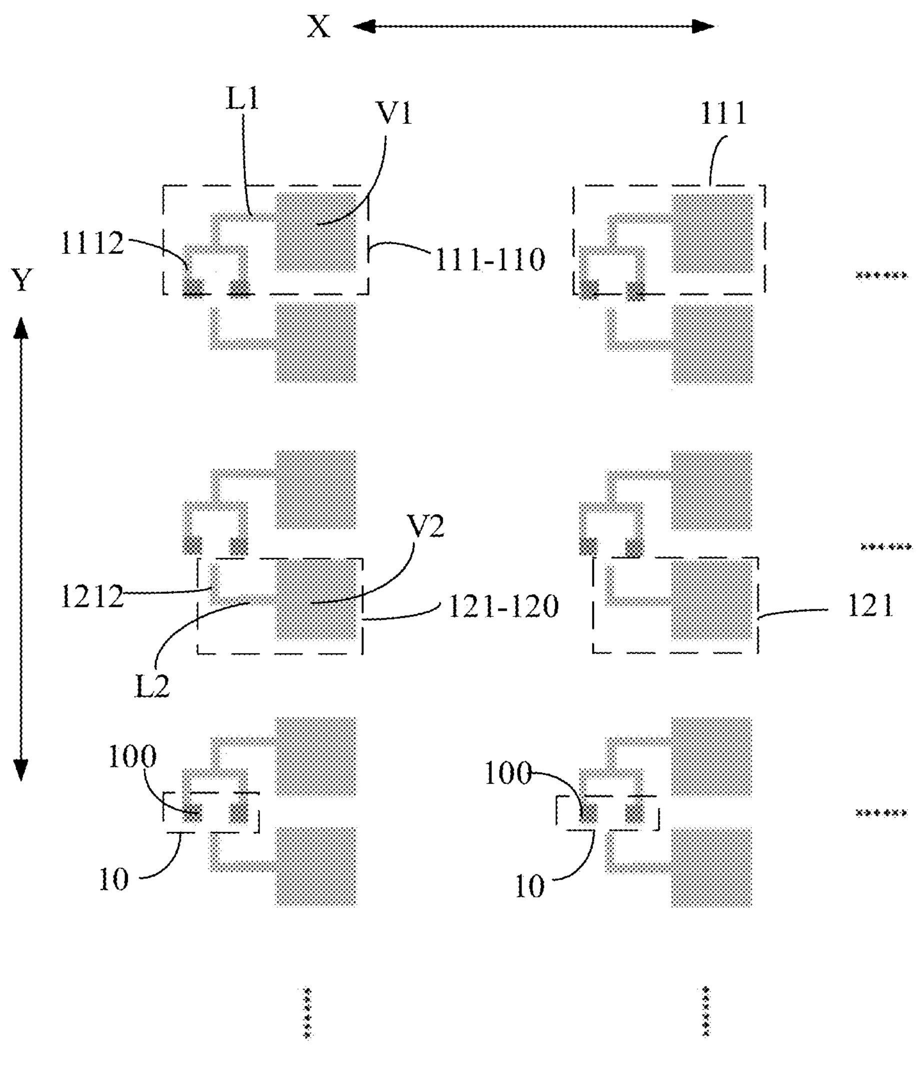
FIG. 7 is a schematic diagram of structures of a first conductive layer and a second conductive layer of an optical relay device in yet another exemplary embodiment of the present disclosure.

As shown in FIGS. 4 and 7, in some other embodiments of the present disclosure, the first conductive layer 110 includes a plurality of first connection units 111 arranged at intervals, and the first connection unit 111 includes a first power supply end V1. The second conductive layer 120 includes a plurality of second connection units 121 arranged at intervals, and the second connection unit 121 includes a second power supply end V2. The light emitter 100 is provided with a first pole 101 and a second pole 105. The first pole 101 of the light emitter 100 in the light emitting unit 10 is connected to the first connection unit 111, and the second pole 105 of the light emitter 100 in the light emitting unit 10 is connected to the second connection unit 121. The first power supply end V1 may provide a first voltage VDD or VSS or a data voltage, and correspondingly, the second power supply end V2 may provide a second voltage VSS or VDD or a data voltage. The light emitting units 10, the first connection units 111, and the second connection units 121 are in one-to-one correspondence in a connecting relationship. In this embodiment, the light emitting units 10, the first connection units 111 and the second connection units 121 are equal in number, and one light emitting unit 10 is connected to one first connection unit 111 and one second connection unit 121.

The first conductive layer 110, the second conductive layer 120, and the light emitting unit 10 correspondingly connected to the first conductive layer 110 and the second conductive layer 120 are provided on a same side of the substrate 1. For example, the first conductive layer 110, the second conductive layer 120 and the light emitting unit 10 are all provided on the first side B1 of the substrate 1. As in the above embodiments, the first conductive layer 110 and the second conductive layer 120 may be provided in a same layer or in different layers, which is not limited in the present disclosure. The first conductive layer 110, the second conductive layer 120, and the light emitter 100 may be connected via the face-up structure, the vertical structure and the flip structure, which may be selected according to the actual situation.

The first conductive layer 110 and the second conductive layer 120 may have various patterns. In a specific embodiment, the first connection unit 111 includes a first connection line L1 and a first branch 1112, and the first branch 1112 is connected to the first power supply end V1 through the first connection line L1. The first connection line L1 may extend along the second direction X, and the first branch 1112 may extend along the first direction Y The number of the first branch 1112 may be one, two or more, and when the number of the first branch 1112 is at least two, different first branches 1112 may be arranged along the second direction X, as shown in FIG. 7. One, two or more light emitters 100 may be connected to one first branch 1112, which is not limited in the present disclosure. For example, in a specific embodiment, a single first connection unit 111 includes two first branches 1112, two light emitters 100 are included in a single light emitting unit 10, and one light emitter 100 is connected to one first branch 1112.

The second connection unit 121 includes a second connection line L2 and a second branch 1212, and the second branch 1212 is connected to the second power supply end V2 through the second connection line L2. The second connection line L2 may extend along the second direction X, and the second branch 1212 may extend along the first direction Y The number of the second branch 1212 may be one, two, or more, and when the number of the second branch 1212 is at least two, different second branches 1212 may be arranged along the second direction X. One, two, or more light emitters 100 may be connected to one second branch 1212, which is not limited in the present disclosure. For example, in a specific embodiment, a single second connection unit 121 includes one second branch 1212, two light emitters 100 are included in a single light emitting unit 10, and two light emitters 100 are connected to one second branch 1212.

Figure 5:
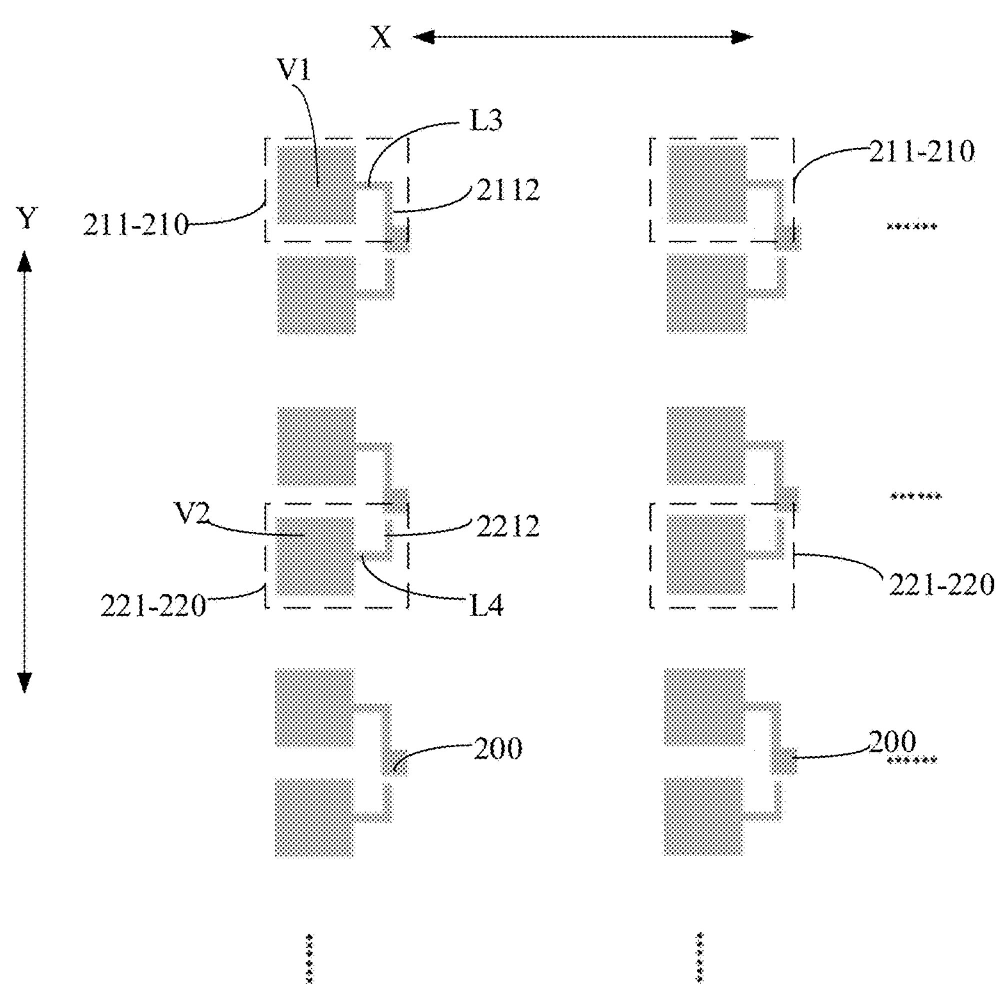
FIG. 5 is a schematic diagram of structures of a third conductive layer and a fourth conductive layer of an optical relay device in another exemplary embodiment of the present disclosure.
Figure 8:
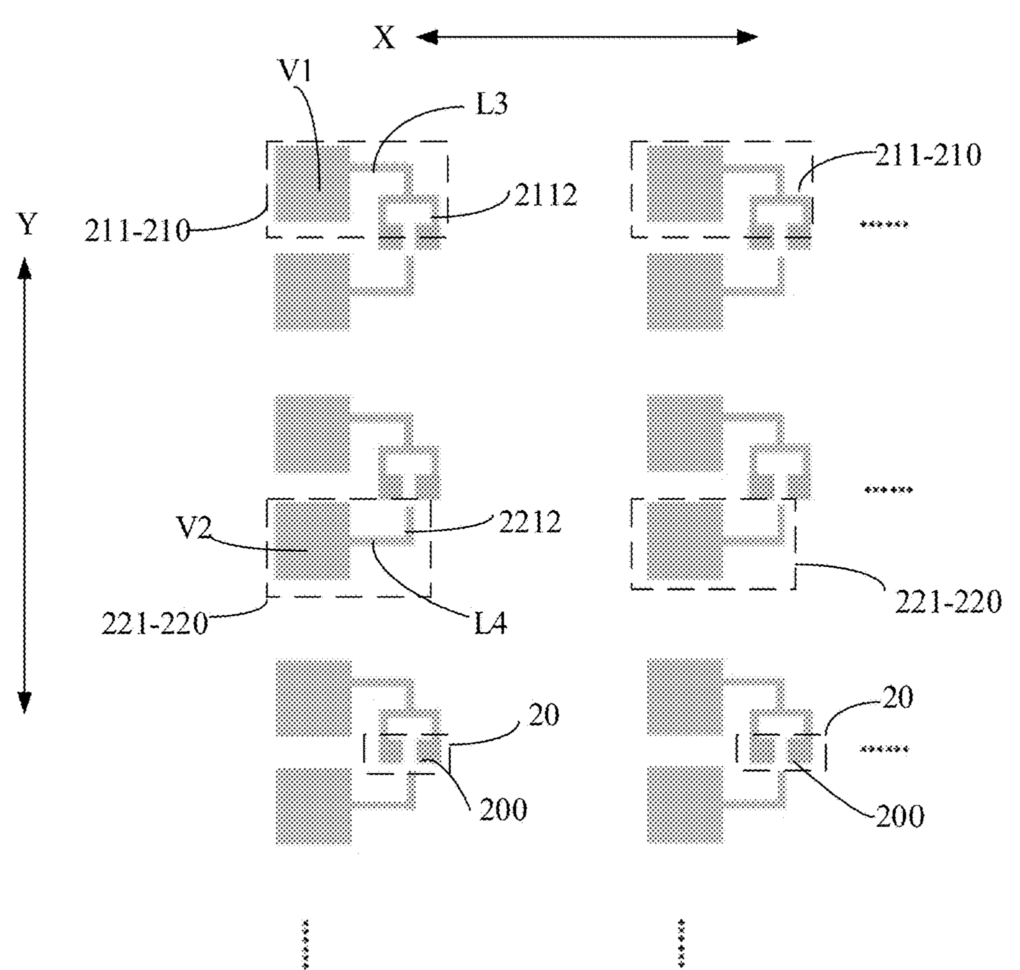
FIG. 8 is a schematic diagram of structures of a third conductive layer and a fourth conductive layer of an optical relay device in yet another exemplary embodiment of the present disclosure.

As shown in FIGS. 5 and 8, the third conductive layer 210 includes a plurality of third connection units 211 arranged at intervals, and the third connection unit 211 includes a first power supply end V1. The fourth conductive layer 220 includes a plurality of fourth connection units 221 arranged at intervals, and the fourth connection unit 221 includes a second power supply end V2. The light receiver 200 is provided with a first pole 101 and a second pole 105, the first pole 101 of the light receiver 200 in the light receiving unit 20 is connected to the third connection unit 211, and the second pole 105 of the light receiver 200 in the light receiving unit 20 is connected to the fourth connection unit 221. As above, the first power supply end V1 may provide a first voltage VDD or VSS or a data voltage, and correspondingly, the second power supply end V2 may provide a second voltage VSS or VDD or a data voltage. The light receiving units 20, the third connection units 211, and the fourth connection units 221 are in one-to-one correspondence in a connecting relationship. In this embodiment, the light receiving units 20, the third connection units 211 and the fourth connection units 221 are equal in number, and one light receiving unit 20 is connected to one third connection unit 211 and one fourth connection unit 221.

The third conductive layer 210, the fourth conductive layer 220, and the light receiving unit 20 correspondingly connected to the third conductive layer 210 and the fourth conductive layer 220 are provided on a same side of the substrate 1. For example, the third conductive layer 210, the fourth conductive layer 220 and the light receiving unit 20 are all provided on the second side B2 of the substrate 1. As in the above embodiment, the third conductive layer 210 and the fourth conductive layer 220 may be provided in a same layer or in different layers, which is not limited in the present disclosure. The third conductive layer 210, the fourth conductive layer 220, and the light receiver 200 may be connected via the face-up structure, the vertical structure and the flip structure, which may be selected according to the actual situation.

The third conductive layer 210 and the fourth conductive layer 220 may have various patterns. In a specific embodiment, the third connection unit 211 includes a third connection line L3 and a third branch 2112, and the third branch 2112 is connected to the first power supply end V1 through the third connection line L3. The third connection line L3 may extend along the second direction X, and the third branch 2112 may extend along the first direction Y The number of the third branch 2112 may be one, two, or more, and when the number of the third branch 2112 is at least two, different third branches 2112 may be arranged along the second direction X. One, two, or more light emitters 100 may be connected to one third branch 2112, which is not limited in the present disclosure. For example, in a specific embodiment, a single third connection unit 211 includes two third branches 2112, two light emitters 100 are included in a single light emitting unit 10, and one light emitter 100 is connected to one third branch 2112.

The fourth connection unit 221 includes a fourth connection line L4 and a fourth branch 2212, and the fourth branch 2212 is connected to the second power supply end V2 through the fourth connection line L4. The fourth connection line L4 may extend along the second direction X, and the fourth branch 2212 may extend along the first direction Y The number of the fourth branch 2212 may be one, two, or more, and when the number of the fourth branch 2212 is at least two, different fourth branches 2212 may be arranged along the second direction X. One, two, or more light emitters 100 may be connected to one fourth branch 2212, which is not limited in the present disclosure. For example, in a specific embodiment, a single fourth connection unit 221 includes one fourth branch 2212, two light emitters 100 are included in a single light emitting unit 10, and two light emitters 100 are connected to one fourth branch 2212.

Figure 6:
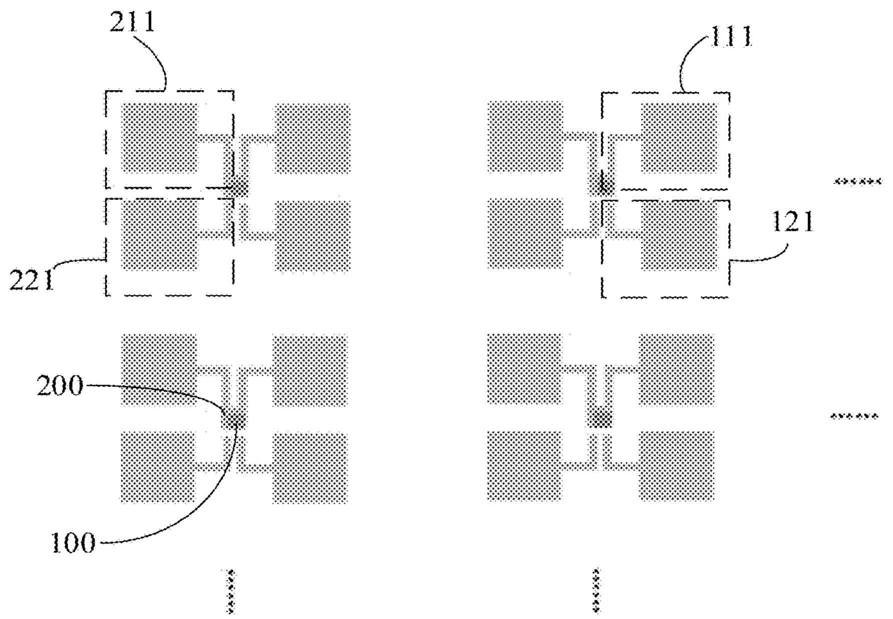
FIG. 6 is a schematic diagram of corresponding structures of a first conductive layer, a second conductive layer, a third conductive layer, and a fourth conductive layer in another exemplary embodiment of the present disclosure.
Figure 9:
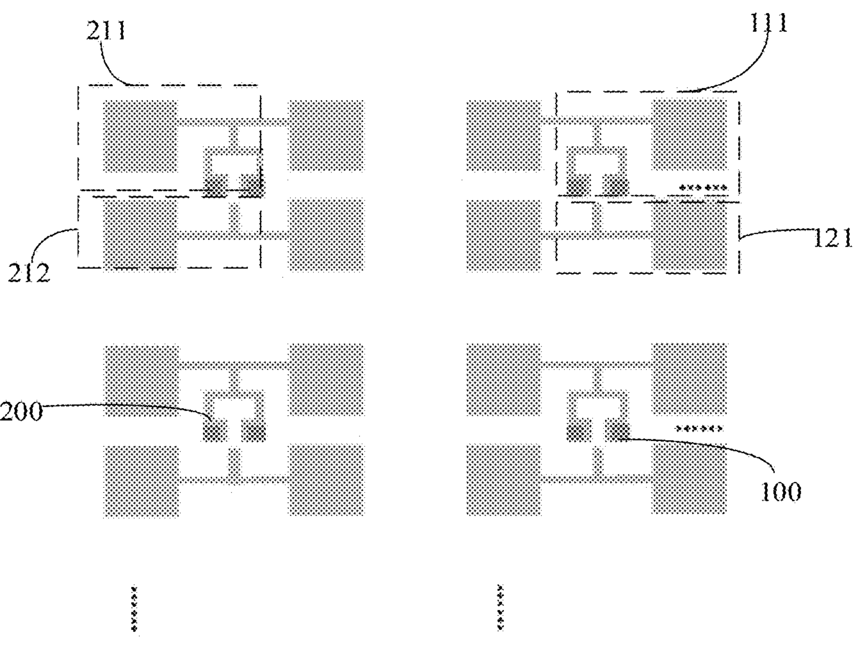
FIG. 9 is a schematic diagram of corresponding structures of a first conductive layer, a second conductive layer, a third conductive layer, and a fourth conductive layer in yet another exemplary embodiment of the present disclosure.

In this embodiment, each of the first connection units 111 and each of the third connection units 211 are provided with the first power supply end V1, and each of the second connection units 121 and each of the fourth connection units 221 are provided with the second power supply end V2. Therefore, each first connection unit 111, each light emitting unit 10, each second connection unit 121, each third connection unit 211, each light receiving unit 20, and each fourth connection unit 221 that are correspondingly provided can form a transmission channel, as shown in FIG. 6 and FIG. 9. In this manner, different signals can be transmitted on different signal transmission channels, and all signal transmission channels may be then integrated by using algorithms, which helps to increase the signal transmission rate by tens to hundreds of times.

As shown in FIG. 10, in the present disclosure, the first conductive layer 110, the second conductive layer 120, the third conductive layer 210, and the fourth conductive layer 220 may be formed by using a variety of processes, such as a lift-off process and a wet etching process. The base plate 004, such as a glass base plate or a flexible transparent base plate, is first cleaned with pure water, ethanol, and the like, respectively, to remove large particles of adherents on the surface of the base plate 004, and then the base plate 004 is irradiated with UV light to further remove organic matter attached to the base plate 004. The adhesive is then coated on the base plate 004, ensuring that the thickness of the adhesive coated is greater than the thickness of the conductive layer formed by deposition. Exposure is carried out by using a designed mask, and then develop is carried out with a developer solution. Magnetron sputtering is used to deposit the desired conductive materials, such as depositing molybdenum, aluminum, and molybdenum separately to form a sandwich structure, improving the bonding strength between the conductive layer and the base plate 004, and enhancing the stability of the conductive layer in use. Finally, the photoresist is removed by using a solvent such as acetone to obtain the desired conductive layer.

Another example is the wet etching process. The base plate 004, such as a glass base plate or a flexible transparent base plate, is first cleaned with pure water, ethanol, and the like, respectively, to remove large particles of adherents on the surface of the base plate 004, and then the base plate 004 is irradiated with UV light to further remove organic matter attached to the base plate 004. Magnetron sputtering is used to deposit the desired conductive materials, such as depositing molybdenum, aluminum, and molybdenum separately to form a sandwich structure, improving the bonding strength between the conductive layer and the base plate 004, and enhancing the stability of the conductive layer in use. Subsequently, the adhesive is coated, exposure is carried out by using a designed mask, and then develop is carried out with a developing solution. After development, the wet etching is performed on the deposited conductive material layer to etch away unwanted structures. Finally, the photoresist is removed by using a solvent such as acetone to obtain the desired conductive layer.

The light emitter 100 and the light receiver 200 may be thin-film devices. For example, as shown in FIGS. 11 to 15, in some embodiments of the present disclosure, the light emitter 100 includes a first pole 101, a first charge transport layer 102, a light emitting layer 103, a second charge transport layer 104, and a second pole 105. The first charge transport layer 102, the light emitting layer 103, and the second charge transport layer 104 are provided sequentially along a direction away from the substrate 1. The first pole 101 is connected to the first charge transport layer 102, and the second pole 105 is connected to the second charge transport layer 104.

In an embodiment, the light emitter 100 may be a light emitting diode (LED). The first pole 101 may be an N electrode or a P electrode, and correspondingly, the second pole 105 may be a P electrode or an N electrode. The first charge transport layer 102 may be an N-type semiconductor layer or a P-type semiconductor layer, and correspondingly, the second charge transport layer 104 may be a P-type semiconductor layer or an N-type semiconductor layer. Materials of the N-type semiconductor layer, the P-type semiconductor layer, and the light emitting layer 103 may be selected according to the actual light emission requirements. The LED may achieve a light emission with the full visible light frequency band. Through the design and selection of the material, it is possible to achieve a light emission with a specific wavelength in the visible light frequency band range. For example, the light emitting wavelength range of the red light is 620 nm-940 nm, and optional materials include AlGaAs/GaAsP/AlGaInP and the like. The light emitting wavelength range of the green light is 500 nm-560 nm, and optional materials include InGaN/GaN/GaN/AlGaInP/AlGaP and the like. The light emitting wavelength range of the blue light is 400 nm-480 nm, and optional light emitting materials include SiC/Si/$Al_2O_3$ and the like. In this embodiment, the light emitter 100 further includes an underlayment 001. The underlayment 001 is provided on the first charge transport layer 102 or on a side of the first charge transport layer 102 away from the light emitting layer 103. For example, the underlayment 001 is provided on a side of the N-type semiconductor layer away from the light emitting layer 103. The material of the underlayment 001 may be selected from silicon, silicon carbide, sapphire, alumina, and the like, which is not limited in the present disclosure.

It should be noted herein that the light emitting diode (LED) in this embodiment may be a vertical structure, a face-up structure or a flip structure. In this embodiment, for ease of description, the first pole 101 is defined as an N electrode, the first charge transport layer 102 is an N-type semiconductor layer, the second charge transport layer 104 is a P-type semiconductor layer, and the second pole 105 is a P electrode.

Figure 11:
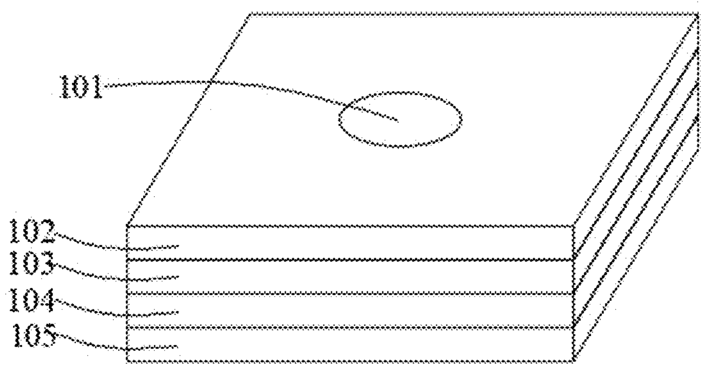
FIG. 11 is a schematic diagram of a vertical structure in which the light emitter is an LED in an exemplary embodiment of the present disclosure.
Figure 12:
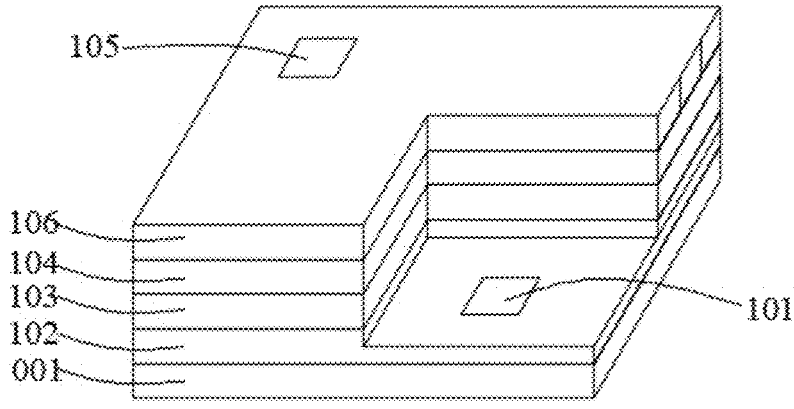
FIG. 12 is a schematic diagram of an LED face-up structure in which the light emitter is an LED in an exemplary embodiment of the present disclosure.
Figure 13:
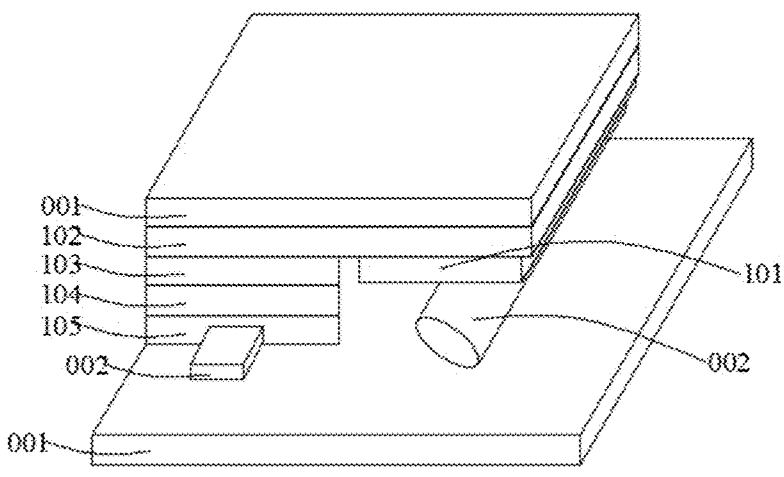
FIG. 13 is a schematic diagram of an LED flip structure in which the light emitter is an LED in an exemplary embodiment of the present disclosure.

As shown in FIG. 11, the LED is a vertical structure, and in a direction substantially perpendicular to the substrate 1, the light emitter 100 sequentially includes an N electrode (the first pole 101), an N-type semiconductor layer (the first charge transport layer 102), a light emitting layer 103, a P-type semiconductor layer (the second charge transport layer 104), and a P electrode (the second pole 105). As further shown in FIG. 12, the LED is a face-up structure, and a P-type semiconductor layer (the second charge transport layer 104), the light emitting layer 103, and an N-type semiconductor layer (the first charge transport layer 102) in the light emitter 100 are arranged sequentially, in a direction substantially perpendicular to the substrate 1, along a direction away from the substrate 1. The P electrode is connected to a side of the P-type semiconductor layer close to the substrate 1. A transparent conductive layer 002 is further provided between the P electrode and the P-type semiconductor layer. A partial region of the N-type semiconductor layer may be exposed by the transparent conductive layer 002, the P-type semiconductor layer, and the light emitting layer 103, and the N electrode is connected to the exposed region of the N-type semiconductor layer. The underlayment 001 is provided on a side of the N-type semiconductor layer away from the substrate 1. The underlayment 001 may be a sapphire or silicon carbide underlayment. As further shown in FIG. 13, the LED is a flip structure, and the light emitter 100 has the N-type semiconductor layer (the first charge transport layer 102), the light emitting layer 103, and the P-type semiconductor layer (the second charge transport layer 104) sequentially arranged, in a direction substantially perpendicular to the substrate 1, in a direction away from the substrate 1, and the P electrode is connected to the P-type semiconductor layer. A partial region of the N-type semiconductor layer may be exposed the P-type semiconductor layer and the light emitting layer 103, and the N electrode is connected to the exposed region of the N-type semiconductor layer. The light emitter 100 further includes a connection structure 002 by which the N electrode and the P electrode are led out to a same plane to facilitate the connection, such as planar welding, to the first conductive layer 110 and the second conductive layer 120. The flip structured LED further includes a base 003 to which the connection structure 002 leads the N electrode and the P electrode. The underlayment 001 is provided between the N-type semiconductor layer and the substrate 1, and the underlayment 001 is a transparent material to allow the light emitted from the light emitter 100 to pass through the substrate 1. The circuit design and lead welding of the LEDs of different structures are also slightly different, which can be adapted according to the actual situation.

Figure 14:
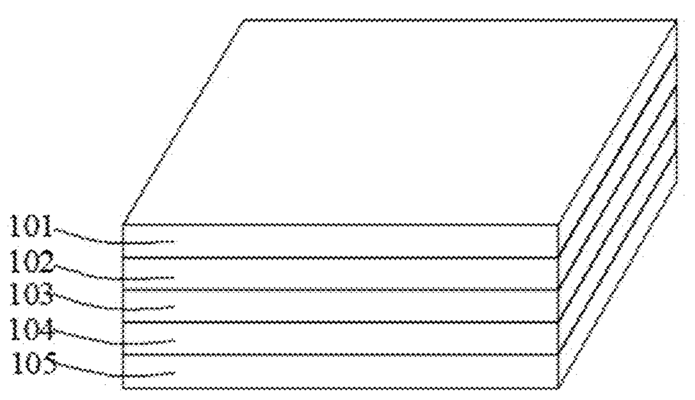
FIG. 14 is a schematic diagram of a structure in which the light emitter is a QLED or OLED in an exemplary embodiment of the present disclosure.

As shown in FIG. 14, in another embodiment, the light emitter 100 may be a quantum dot light emitting diode (QLED) or an organic light emitting diode (OLED). The first pole 101 may be an anode or a cathode, and accordingly, the second pole 105 may be a cathode or an anode. The first charge transport layer 102 may be a hole transport layer or an electron transport layer, and accordingly, the second charge transport layer 104 may be an electron transport layer or a hole transport layer. The light emitting layer 103 may be a quantum dot light emitting layer or an organic light emitting layer. When the light emitting layer 103 is a quantum dot light emitting layer, the QLED can achieve a light emission with the full visible light frequency band. The light emitting wavelength is determined by the material of the quantum dot light emitting layer. The electron transport layer and the hole transport layer (the first charge transport layer 102 and the second charge transport layer 104) need to match the quantum dot light emitting layer, so as to improve the light emitting efficiency. Quantum dot light emitting materials are divided into cadmium-containing and cadmium-free materials. In general, the cadmium-containing materials have a high light emitting efficiency and environmental pollution, while the cadmium-free materials are environmentally friendly, but their light emitting efficiency is low. The light emitting wavelength range of the red light is 620 nm-940 nm, optional cadmium-containing quantum dot materials including CdSe/CdS/CdZnSe and the like, optional cadmium-free quantum dot materials including InP/ZnSeS/ZnSe/ZnS and the like, and the ratio of different materials may be adjusted to achieve the regulation of the light emitting wavelength. The light emitting wavelength range of the green light is 500 nm-560 nm, optional cadmium-containing quantum dot materials including CdSe/ZnS/ZnCdSe and the like, optional cadmium-free quantum dot materials including InP/ZnSeS/ZnS and the like, and the ratio of different materials may be adjusted to achieve the regulation of the light emitting wavelength. The light emitting wavelength range of the blue light is 400 nm-480 nm, optional cadmium-containing quantum dot materials including ZnCdS/ZnS/CdSe and the like, and the ratio of different materials may be adjusted to achieve the regulation of the light emitting wavelength. Similarly, the light emitting wavelength of the OLED is determined by the material of the organic light emitting layer. The electron transport layer and the hole transport layer (the first charge transport layer 102 and the second charge transport layer 104) need to be matched with the organic light emitting layer, which can be selected by those skilled in the art according to the actual needs, and is not described in detail herein.

It should be noted herein that the QLED and OLED in this embodiment may be a positively installed top emitting structure or reversely installed bottom emitting structure. For example, if the light emitter 100 is the positively installed top emitting structure, an anode, a hole transport layer, a quantum dot or an organic light emitting layer 103, an electron transport layer, and a cathode of the light emitter 100 are provided sequentially, in the direction substantially perpendicular to the substrate 1, along the direction away from the substrate 1, and the emitting device emits light from the anode. As another example, if the light emitter 100 is the reversely installed bottom emitting structure, a cathode, an electron transport layer, a quantum dot or an organic light emitting layer 103, a hole transport layer, and an anode of the light emitter 100 are provided sequentially, in the direction substantially perpendicular to the substrate 1, along the direction away from the substrate 1, and the emitting device emits light from the cathode. The circuit design and lead welding of QLEDs and OLEDs of different structures are also slightly different, which can be adapted according to the actual situation.

Figure 15:
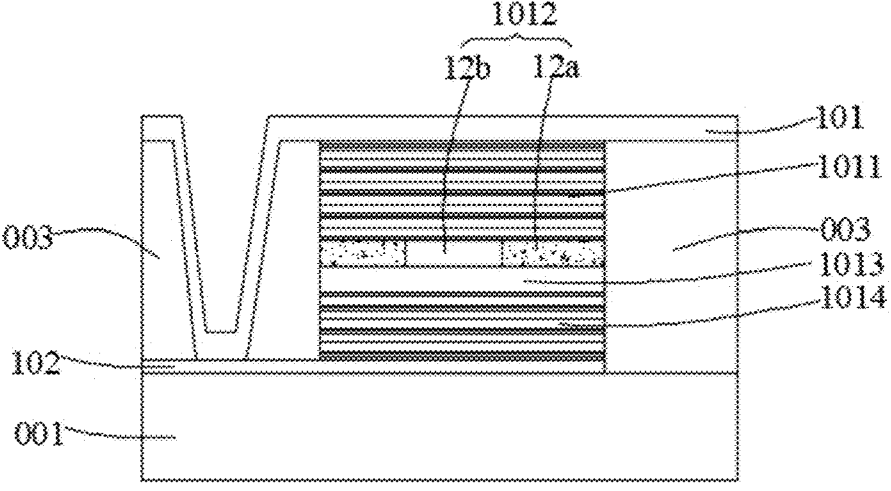
FIG. 15 is a schematic diagram of a structure in which the light emitter is a VCSEL in an exemplary embodiment of the present disclosure.

As shown in FIG. 15, in yet another embodiment, the light emitter 100 may be a vertical-cavity surface-emitting laser (VCSEL). The light emitter 100 includes a first reflecting mirror 1011, an oxidation confinement layer 1012, an active layer 1013, a second reflecting mirror 1014, a first pole 101, and a second pole 105. The first reflecting mirror 1011, the oxidation confinement layer 1012, the active layer 1013, and the second reflecting mirror 1014 are provided sequentially along a direction substantially perpendicular to the substrate 1. The oxidation confinement layer 1012 includes an unoxidized zone **12*b* and an oxidation zone 12*a* located at the periphery of the unoxidized zone 12*b*. The first pole 101 is connected to the first reflecting mirror 1011, and the second pole 105 is connected to the second reflecting mirror 1014**.

The first reflecting mirror 1011 and the second reflecting mirror 1014 may be distributed Bragg reflecting mirrors, made of two materials with different refractive indices alternately laminated. Both the first reflecting mirror 1011 and the second reflecting mirror 1014 have a high refractive index to produce strongly reflected light at a certain wavelength, and the strongly reflected light is reflected between the first reflecting mirror 1011 and the second reflecting mirror 1014 to form a vertical cavity. The active layer 1013 is an important part of the VCSEL, due to the extremely short cavity length of the VCSEL, it is necessary to have an active medium in the cavity to provide a large gain compensation for the excitation mode, and the active layer can adopt a quantum well structure. The oxidation confinement layer 1012 includes the unoxidized zone **12*b* and the oxidation zone 12*a* located at the periphery of the unoxidized zone 12*b*. The oxidation confinement layer 1012 may be an aluminum gallium arsenide (AlGaAs) layer with a high aluminum component, and oxidizing from the side periphery of the layer towards the central part of the layer to form the oxidation confinement layer 1012 having the oxidation zone 12***a* and the unoxidized zone 12*b*. The oxidation zone 12*a* of the oxidation confinement layer 1012 has a lower refractive index, and the light can be restricted to the unoxidized zone 12*b* surrounded by the oxidation zone 12*a*.

The VCSEL further includes an insulating film 003. The insulating film 003 is provided between the first pole 101 and the oxidation confinement layer 1012, the active layer 1013 and the second reflecting mirror 1014. The insulating film 003 is provided between the second pole 105 and the oxidation confinement layer 1012, the active layer 1013 and the first reflecting mirror 1011.

It should be noted herein that the VCSEL may be a top emitting structure or a bottom emitting structure. For example, if the VCSEL is the top emitting structure, the first reflecting mirror 1011, the oxidation confinement layer 1012, the active layer 1013, and the second reflecting mirror 1014 of the VCSEL are provided sequentially along a direction away from the substrate 1. The first reflecting mirror 1011 is a P-type reflecting mirror, and the second reflecting mirror 1014 is an N-type reflecting mirror. The refractive index of the second reflecting mirror 1014 may be close to 100% to serve as a total reflecting mirror of a resonant cavity, and the refractive index of the first reflecting mirror 1011 may be relatively low to serve as an output mirror of the resonant cavity. The VCSEL further includes an underlayment 001, which is provided on a side of the second reflecting mirror 1014 away from the substrate 1. As another example, if the VCSEL is the bottom emitting structure, the second reflecting mirror 1014, the active layer 1013, the oxidation confinement layer 1012, and the first reflecting mirror 1011 of the VCSEL are provided sequentially along the direction away from the substrate 1. The first reflecting mirror 1011 is a P-type reflecting mirror, and the second reflecting mirror 1014 is an N-type reflecting mirror. The refractive index of the first reflecting mirror 1011 may be close to 100% to serve as a total reflecting mirror of the resonant cavity, and the second reflecting mirror 1014 may have a relatively low refractive index to serve as the output mirror of the resonant cavity. The VCSEL further includes an underlayment 001, which is provided on a side of the second reflecting mirror 1014 close to the substrate 1. The underlayment 001 is made of a transparent material to allow light emitted from the light emitter 100 to pass through the substrate 1. The circuit design and lead welding of the VCSELs of different structures are also slightly different, which can be adapted according to the actual situation.

It should be noted herein that, regardless of the structure of the light emitter 100, the light output side should be close to the side of the substrate 1.

Figure 16:
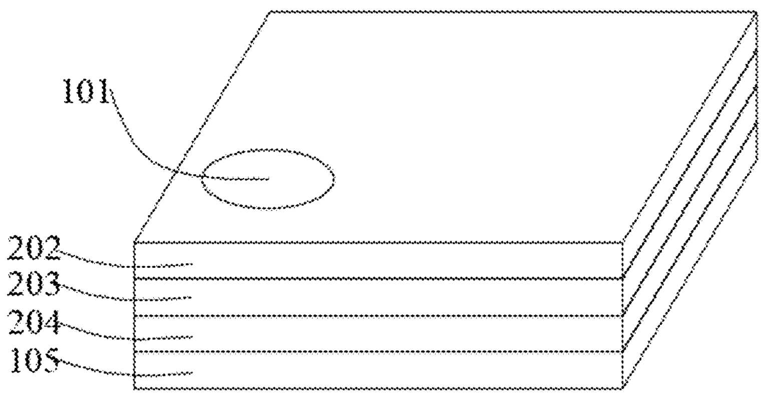
FIG. 16 is a schematic diagram of a structure in which the light receiver is a PIN diode in an exemplary embodiment of the present disclosure.
Figure 17:
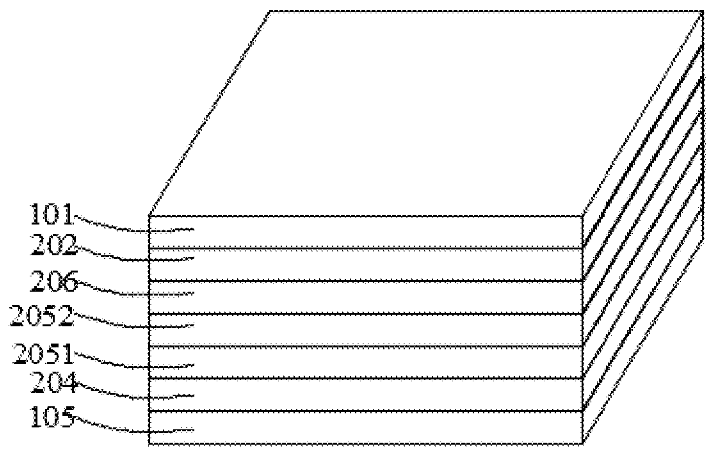
FIG. 17 is a schematic diagram of a structure in which the light receiver is an APD diode in an exemplary embodiment of the present disclosure.

As shown in FIGS. 16 and 17, the light receiver 200 includes a first pole 101, a first semiconductor layer 202, a photoelectric conversion layer 203, a second semiconductor layer 204, and a second pole 105. The first semiconductor layer 202, the photoelectric conversion layer 203, and the second semiconductor layer 204 are provided sequentially along a direction away from the substrate 1. The first pole 101 is connected to the first semiconductor layer 202, and the second pole 105 is connected to the second semiconductor layer 204.

The light receiver 200 may be a PIN diode. The first pole 101 may be a P electrode, and correspondingly, the second pole 105 may be an N electrode. The first semiconductor layer 202 may be a P-type semiconductor layer, and correspondingly, the second semiconductor layer 204 may be an N-type semiconductor layer. The photoelectric conversion layer 203 may be an intrinsic (I) semiconductor layer. The I semiconductor layer (the photoelectric conversion layer 203) of the PIN diode generates a photo-generated current when it receives light of a corresponding wavelength. The PIN diode has a high responsiveness, a fast response speed, a wide frequency band, a low operating voltage, and a simple bias circuit, and can withstand a higher reverse voltage under reverse bias voltage, so its linear output range is wide. However, the disadvantage is in that the resistance of the I semiconductor layer (the photoelectric conversion layer 203) is very high, and the output current of the diode is small, usually ranging from a few tenths of a microampere to a few microamperes. Therefore, in the present disclosure, the PIN photodiode is connected to a trans-impedance amplifier 40. The PIN diode converts an optical signal into a current signal, and then the trans-impedance amplifier 40 converts the current signal into a voltage signal and amplifies it to a desired amplitude, which helps to improve the signal-to-noise ratio and reduce the error rate.

The light receiver 200 may be an APD diode, i.e. an avalanche diode. Compared to the PIN diode, the APD diode has an additional avalanche layer 205. The avalanche layer 205 is provided between the photoelectric conversion layer 203 and the second semiconductor layer 204. The avalanche layer 205 undergoes avalanche breakdown under the action of an electric field, the energy of charge carriers is increased, and the charge carriers continuously collide with crystal atoms, resulting in the excitation of electrons in covalent bonds to form free electron hole pairs. The newly generated charge carriers generate free electron hole pairs through collisions, which is known as the multiplication effect. Under the action of the multiplication effect, the number of charge carriers 1 generates 2, 2 generates 4, increasing like an avalanche. The APD diode utilizes the avalanche multiplication effect of charge carriers to amplify the photoelectric signal in order to improve the detection sensitivity. Compared with the PIN diode, the APD diode has the additional avalanche layer 205, so the photo-generated current will be amplified by this area. Therefore, the ADP photodiode has the advantages of high power and high efficiency. For the APD diode, the photoelectric conversion layer 203 may include an absorption layer 2051 and a charge layer 2052.

As shown in FIG. 1, in some embodiments of the present disclosure, both the first transmission module 2 and the second transmission module 3 further include a laser driver 30 and a trans-impedance amplifier 40. The laser driver 30 is configured to receive an electrical signal converted from a microwave signal and transmit the electrical signal to the light emitting unit 10 for driving the light emitting unit 10 to emit the optical signal. The laser driver 30 may include a bias current generator, a differential current switching circuit, an automatic power control circuit (APC), a protection circuit, and the like. The bias current generator is configured to output a direct current (DC) bias current to the laser that is large enough to meet the optical power requirement. The differential current switching circuit is configured to output a modulated current to the laser. The automatic power control circuit (APC) is configured to detect the magnitude of the output current of the photoelectric conversion diode and dynamically adjust the magnitude of the drive current of the laser to achieve the stability of the output optical power thereof. The protection circuit is configured to protect the light emitting elements, such as light emitting diodes, from breakdown. Specifically, the protection circuit may be connected to the drive circuit and the light emitting elements, when the voltage is greater than a certain value, a DC current flows to the protection circuit, thus preventing breakdown of the light emitting elements, etc.

The light receiving unit 20 is configured to receive the optical signal emitted by the light emitting unit 10, convert the optical signal into a current signal, and then output the current signal. The trans-impedance amplifier 40 is configured to receive the current signal output by the light receiving unit 20, convert the current signal into a voltage signal, and then amplify and output the voltage signal.

Figure 19:
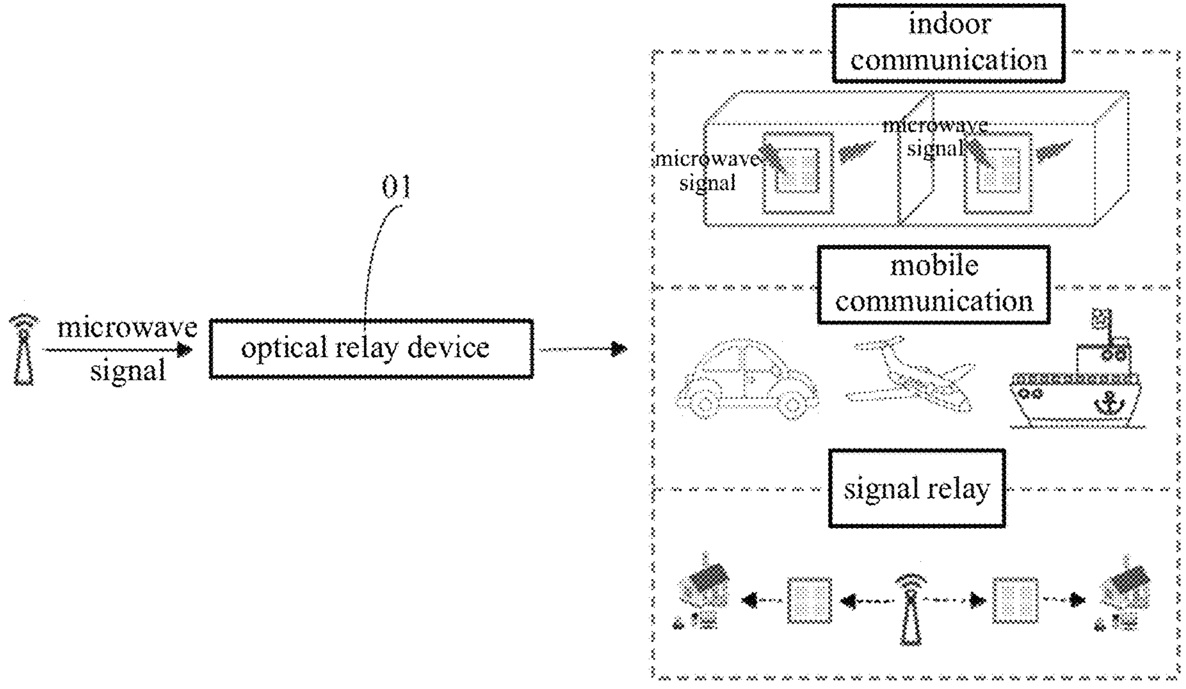
FIG. 19 is a schematic diagram of an application scenario of an optical relay device in an exemplary embodiment of the present disclosure.

As shown in FIG. 19, the optical relay device 01 provided by the present disclosure may be applied in a variety of scenarios, such as the glass windows of a building or the windows of a variety of vehicles, such as an automobile, an aircraft, a ship, and the like. When the optical relay device 01 of the present disclosure is applied to a building, it helps to solve the indoor 5G signal coverage problem. When the optical relay device 01 of the present disclosure is applied to a vehicle, it helps to achieve real-time reception of 5G signals in an outdoor mobile scene. In addition, the optical relay device 01 in the present disclosure may be used for signal conversion of a microwave relay station, reducing the construction cost of the relay station.

Figure 18:
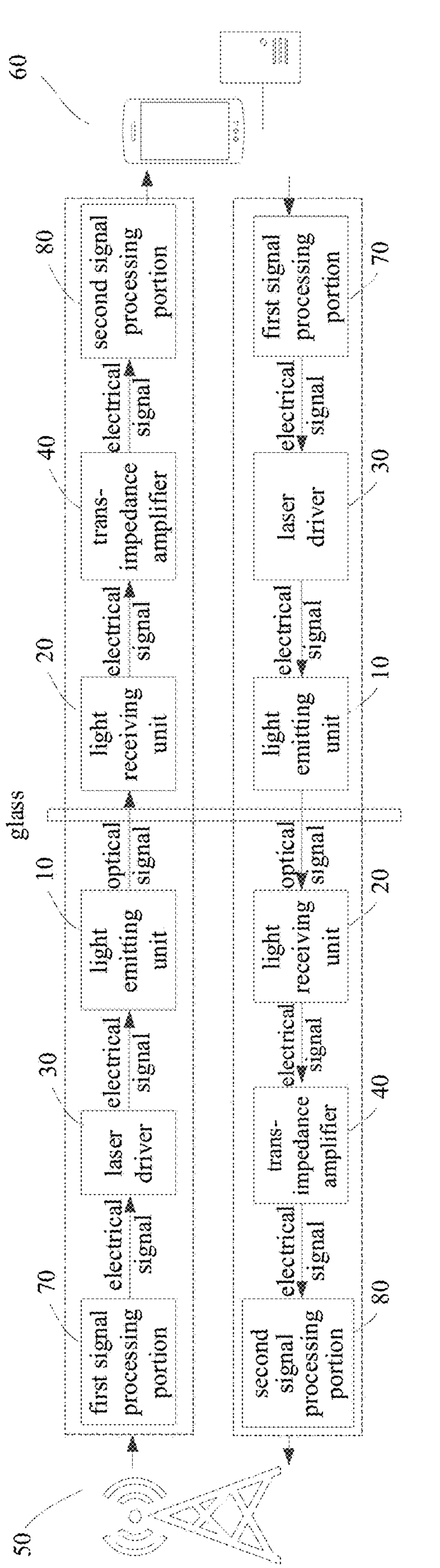
FIG. 18 is a schematic diagram of a structure of a signal transmission system in an exemplary embodiment of the present disclosure.

As shown in FIG. 18, the present disclosure further provides a signal transmission system including a communication station and the optical relay device 01 as in any of the above embodiments. The communication station includes a first communication station 50 for sending and receiving an electrical signal, and a second communication station 60 for sending and receiving an electrical signal. The optical relay device 01 relays the electrical signal output by the first communication station 50 to the second communication station 60 and relays the electrical signal output by the second communication station 60 to the first communication station 50. The signal transmission system may further include a first signal processing portion 70 and a second signal processing portion 80. The first signal processing portion 70 is configured to collect an electrical signal converted from a microwave signal, such as the electrical signal output by the communication station, and output the electrical signal to the optical relay device after processing, such as filtering, amplifying or digitizing and the like, the electrical signal. The second signal processing portion 80 is configured to receive an electrical signal output by the trans-impedance amplifier 40 in the optical relay device, and output the electrical signal after processing, such as filtering, amplifying, modulating, and the like, the electrical signal.

For example, the first communication station 50 is a signal tower, and the signal tower may include an antenna. The second communication station 60 is a mobile end, and the mobile end may include an antenna. Communication from the signal tower to the mobile end includes the following steps. After a microwave signal, such as a 5G signal, is sent from the signal tower or the base station, it is first converted into a radio-frequency (RF) signal by a microwave receiving antenna, and then the RF signal is converted into a digital signal by the first signal processing portion 70. After the laser driver 30 receives the digital signal, it drives the light emitting unit 10 to emit visible light, the visible light passes through the substrate 1 with low loss and is received by the light receiving unit 20, and the light receiving unit 20 may convert the optical signal into a digital signal. The second signal processing portion 80 converts the digital signal into an RF signal, which is then sent by the microwave sending antenna, and is ultimately received by the mobile end such as a mobile phone or a computer.

Communication from the mobile end to the signal tower includes the following steps. The mobile phone sends a microwave signal through the microwave sending antenna, the microwave signal is first converted into a radio frequency signal by the microwave receiving antenna, and then the radio frequency signal is converted into a digital signal through the first signal processing portion 70. After the laser driver 30 receives the digital signal, it drives the light emitting unit 10 to emit visible light, and the visible light passes through the substrate 1 with low loss and is then received by the light receiving unit 20. The light receiving unit 20 may convert the optical signal into a digital signal, and then the digital signal is converted into a radio frequency signal through the second signal processing portion 80, which is then sent by the microwave sending antenna, and is ultimately received by the signal tower or the base station.

The present disclosure further provides a method for manufacturing an optical relay device 01. The method includes the following steps S100 to S200.

At step S100, a substrate 1 is provided. The substrate 1 has a first side B1 and a second side B2 opposite to each other in a direction substantially perpendicular to the substrate 1.

At step S200, a first transmission module 2 and a second transmission module 3 are formed on the substrate 1. The first transmission module 2 and the second transmission module 3 both include at least one light emitting unit 10 and at least one light receiving unit 20. The light emitting unit 10 is configured to convert an electrical signal into an optical signal, and the light receiving unit 20 is configured to convert an optical signal into an electrical signal. The light emitting unit 10 includes at least one light emitter 100, and when the light emitting unit 10 includes at least two light emitters 100, the light emitters 100 in the light emitting unit 10 are connected in parallel. The light receiving unit 20 includes at least one light receiver 200, and when the light receiving unit 20 includes at least two light receivers 200, the light receivers 200 in the light receiving unit 20 are connected in parallel.

The light emitting unit 10 in the first transmission module 2 is provided on the first side B1 of the substrate 1, and the light receiving unit 20 in the first transmission module 2 is provided on the second side B2 of the substrate 1.

The light emitting unit 10 in the second transmission module 3 is provided on the second side B2 of the substrate 1, and the light receiving unit 20 in the second transmission module 3 is provided on the first side B1 of the substrate 1.

Optical paths of the light receiving units 20 and optical paths of the light emitting units 10 are provided in one-to-one correspondence in the direction perpendicular to the substrate 1, and the light receiving unit 20 and the light emitting unit 10 that are corresponding to each other form a signal transmission channel.

It should be noted that although the steps of the method in the present disclosure are described in a specific order in the drawings, this does not require or imply that the steps must be performed in the specific order, or all steps shown must be performed to achieve desired results. Additionally or alternatively, certain steps may be omitted, multiple steps may be combined into one step for execution, and/or one step may be split into multiple steps for execution, etc., which shall all be considered as part of the present disclosure.

It should be understood that the present disclosure does not limit its application to the detailed structure and arrangement of the components proposed in this specification. The present disclosure can have other implementation manners, and can be implemented and carried out in various ways. The aforementioned variations and modifications fall within the scope of the present disclosure. It should be understood that the disclosure disclosed and defined by this specification extends to all alternative combinations of two or more separate features mentioned or apparent in the text and/or drawings. All of these different combinations constitute various alternative aspects of the present disclosure. The embodiments described in this specification illustrate the best modes known for implementing the disclosure and will enable those skilled in the art to utilize the present disclosure.

What is claimed is:

1. An optical relay device, comprising a substrate, and a first transmission module and a second transmission module that are provided on the substrate, wherein the substrate has a first side and a second side opposite to each other in a direction perpendicular to the substrate; and the first transmission module and the second transmission module both comprise at least one light emitting unit and at least one light receiving unit, wherein the light emitting unit is configured to convert an electrical signal into an optical signal, the light receiving unit is configured to convert an optical signal into an electrical signal, the light emitting unit comprises at least one light emitter, and when the light emitting unit comprises at least two light emitters, the light emitters in the light emitting unit are connected in parallel; the light receiving unit comprises at least one light receiver, and when the light receiving unit comprises at least two light receivers, the light receivers in the light receiving unit are connected in parallel; wherein the light emitting unit in the first transmission module is provided on the first side of the substrate, and the light receiving unit in the first transmission module is provided on the second side of the substrate;

the light emitting unit in the second transmission module is provided on the second side of the substrate, and the light receiving unit in the second transmission module is provided on the first side of the substrate; and optical paths of light receiving units and optical paths of light emitting units are provided in one-to-one correspondence in the direction perpendicular to the substrate, and the light receiving unit and the light emitting unit that are corresponding to each other form a signal transmission channel, wherein the optical relay device further comprises: a first conductive layer, comprising a first power supply end and a plurality of interconnected first connection units connected to the first power supply end; and a second conductive layer, comprising a second power supply end and a plurality of interconnected second connection units connected to the second power supply end; wherein the light emitter is provided with a first pole and a second pole, the first pole of the light emitter in the light emitting unit is connected to the first connection unit, and the second pole of the light emitter in the light emitting unit is connected to the second connection unit; the light emitting units, the first connection units and the second connection units are in one-to-one correspondence in a connecting relationship; and the first conductive layer, the second conductive layer, and the light emitting unit correspondingly connected to the first conductive layer and the second conductive layer are provided on a same side of the substrate; or the optical relay device further comprises: a first conductive layer, comprising a plurality of first connection units arranged at intervals, wherein the first connection unit comprises a first power supply end; and a second conductive layer, comprising a plurality of second connection units arranged at intervals, wherein the second connection unit comprises a second power supply end; wherein the light emitter is provided with a first pole and a second pole, the first pole of the light emitter in the light emitting unit is connected to the first connection unit, and the second pole of the light emitter in the light emitting unit is connected to the second connection unit; the light emitting units, the first connection units and the second connection units are in one-to-one correspondence in a connecting relationship; and the first conductive layer, the second conductive layer, and the light emitting unit correspondingly connected to the first conductive layer and the second conductive layer are provided on a same side of the substrate.

2. The optical relay device according to claim 1, wherein the optical relay device further comprises:

a third conductive layer, comprising a first power supply end and a plurality of interconnected third connection units connected to the first power supply end; and a fourth conductive layer, comprising a second power supply end and a plurality of interconnected fourth connection units connected to the second power supply end; wherein the light receiver is provided with a first pole and a second pole, the first pole of the light receiver in the light receiving unit is connected to the third connection unit, and the second pole of the light receiver in the light receiving unit is connected to the fourth connection unit;

the light receiving units, the third connection units and the fourth connection units are in one-to-one correspondence in a connecting relationship; and the third conductive layer, the fourth conductive layer, and the light receiving unit correspondingly connected to the third conductive layer and the fourth conductive layer are provided on a same side of the substrate.

3. The optical relay device according to claim 1, wherein the first conductive layer further comprises a first connection bus, wherein the first connection bus extends along a first direction, and the plurality of first connection units are connected to the first power supply end through the first connection bus;

the first connection unit comprises a first trunk and a plurality of first branches connected to the first trunk, wherein the first trunk extends along a second direction, the second direction is perpendicular to the first direction, the first connection unit is connected to a side of the first connection bus in the second direction through the first trunk, and the plurality of first connection units are arranged at intervals along the first direction; and the first pole of the light emitter in the light emitting unit is connected to the first branch.

4. The optical relay device according to claim 3, wherein the second conductive layer further comprises a second connection bus, wherein the second connection bus extends along the first direction and is located on a side of the first connection unit away from the first connection bus, and the plurality of second connection units are connected to the second power supply end through the second connection bus;

the second connection unit comprises a second trunk and a plurality of second branches connected to the second trunk, wherein the second trunk extends along the second direction, the second connection unit is connected to a side of the second connection bus close to the first connection unit through the second trunk, and the plurality of second connection units are arranged at intervals along the first direction; and the second pole of the light emitter in the light emitting unit is connected to the second branch.

5. The optical relay device according to claim 2, wherein the third conductive layer further comprises a third connection bus, wherein the third connection bus extends along a first direction, and the plurality of third connection units are connected to the first power supply end through the third connection bus;

the third connection unit comprises a third trunk and a plurality of third branches connected to the third trunk, wherein the third trunk extends along a second direction, the second direction is perpendicular to the first direction, the third connection unit is connected to a side of the third connection bus in the second direction through the third trunk, and the plurality of third connection units are arranged at intervals along the first direction; and the first pole of the light receiver in the light receiving unit is connected to the third branch.

6. The optical relay device according to claim 5, wherein the fourth conductive layer further comprises a fourth connection bus, wherein the fourth connection bus extends along the first direction and is located on a side of the third connection unit away from the third connection bus, and the plurality of fourth connection units are connected to the second power supply end through the fourth connection bus;

the fourth connection unit comprises at least two fourth branches, wherein the fourth branch extends along the second direction, the fourth branch is connected to a side of the fourth connection bus close to the third connection unit, and the plurality of fourth connection units are arranged at intervals along the first direction; and the second pole of the light receiver in the light receiving unit is connected to the fourth branch.

7. The optical relay device according to claim 1, wherein the optical relay device further comprises:

a third conductive layer, comprising a plurality of third connection units arranged at intervals, wherein the third connection unit comprises a first power supply end; and a fourth conductive layer, comprising a plurality of fourth connection units arranged at intervals, wherein the fourth connection unit comprises a second power supply end; wherein the light receiver is provided with a first pole and a second pole, the first pole of the light receiver in the light receiving unit is connected to the third connection unit, and the second pole of the light receiver in the light receiving unit is connected to the fourth connection unit;

the light receiving units, the third connection units and the fourth connection units are in one-to-one correspondence in a connecting relationship; and the third conductive layer, the fourth conductive layer, and the light receiving unit correspondingly connected to the third conductive layer and the fourth conductive layer are provided on a same side of the substrate.

8. The optical relay device according to claim 1, wherein the first connection unit comprises a first connection line and a first branch, wherein the first branch is connected to the first power supply end through the first connection line, the first connection line extends along a second direction, the first branch extends along a first direction, and the second direction is perpendicular to the first direction; and the second connection unit comprises a second connection line and a second branch, wherein the second branch is connected to the second power supply end through the second connection line, the second connection line extends along the second direction, and the second branch extends along the first direction.

9. The optical relay device according to claim 7, wherein the third connection unit comprises a third connection line and a third branch, wherein the third branch is connected to the first power supply end through the third connection line, the third branch extends along a first direction, the third connection line extends along a second direction, and the second direction is perpendicular to the first direction; and the fourth connection unit comprises a fourth connection line and a fourth branch, wherein the fourth branch is connected to the second power supply end through the fourth connection line, the fourth connection line extends along the second direction, and the fourth branch extends along the first direction.

10. The optical relay device according to claim 1, wherein the light emitter comprises a first pole, a first charge transport layer, a light emitting layer, a second charge transport layer, and a second pole; wherein the first charge transport layer, the light emitting layer and the second charge transport layer are provided sequentially along a direction away from the substrate; and the first pole is connected to the first charge transport layer, and the second pole is connected to the second charge transport layer.

11. The optical relay device according to claim 1, wherein the light emitter comprises a first reflecting mirror, an oxidation confinement layer, an active layer, a second reflecting mirror, a first pole, and a second pole; wherein the first reflecting mirror, the oxidation confinement layer, the active layer, and the second reflecting mirror are provided sequentially along a direction substantially perpendicular to the substrate; and the oxidation confinement layer comprises an unoxidized zone and an oxidation zone provided peripheral to the unoxidized zone; and the first pole is connected to the first reflecting mirror, and the second pole is connected to the second reflecting mirror.

12. The optical relay device according to claim 1, wherein the light receiver comprises a first pole, a first semiconductor layer, a photoelectric conversion layer, a second semiconductor layer, and a second pole; wherein the first semiconductor layer, the photoelectric conversion layer and the second semiconductor layer are provided sequentially along a direction away from the substrate; and the first pole is connected to the first semiconductor layer, and the second pole is connected to the second semiconductor layer.

13. The optical relay device according to claim 12, wherein the light receiver further comprises:

an avalanche layer, provided between the photoelectric conversion layer and the second semiconductor layer.

14. The optical relay device according to claim 1, wherein both the first transmission module and the second transmission module further comprise a laser driver and a transimpedance amplifier; wherein the laser driver is configured to receive an electrical signal converted from a microwave signal and transmit the electrical signal to the light emitting unit for driving the light emitting unit to emit the optical signal;

the light receiving unit is configured to receive the optical signal emitted by the light emitting unit, convert the optical signal into a current signal, and then output the current signal; and the trans-impedance amplifier is configured to receive the current signal output by the light receiving unit, convert the current signal into a voltage signal, and then amplify and output the voltage signal.

15. The optical relay device according to claim 14, wherein the microwave signal is a 5th generation (5G) signal.

16. A signal transmission system, comprising a communication station and an optical relay device, wherein the optical relay device comprises a substrate, and a first transmission module and a second transmission module that are provided on the substrate, wherein the substrate has a first side and a second side opposite to each other in a direction perpendicular to the substrate; and the first transmission module and the second transmission module both comprise at least one light emitting unit and at least one light receiving unit, wherein the light emitting unit is configured to convert an electrical signal into an optical signal, the light receiving unit is configured to convert an optical signal into an electrical signal, the light emitting unit comprises at least one light emitter, and when the light emitting unit comprises at least two light emitters, the light emitters in the light emitting unit are connected in parallel; the light receiving unit comprises at least one light receiver, and when the light receiving unit comprises at least two light receivers, the light receivers in the light receiving unit are connected in parallel; wherein the light emitting unit in the first transmission module is provided on the first side of the substrate, and the light receiving unit in the first transmission module is provided on the second side of the substrate;

the light emitting unit in the second transmission module is provided on the second side of the substrate, and the light receiving unit in the second transmission module is provided on the first side of the substrate;

optical paths of light receiving units and optical paths of light emitting units are provided in one-to-one correspondence in the direction perpendicular to the substrate, and the light receiving unit and the light emitting unit that are corresponding to each other form a signal transmission channel;

the communication station comprises a first communication station and a second communication station for sending and receiving an electrical signal; and the optical relay device relays the electrical signal output by the first communication station to the second communication station, and relays the electrical signal output by the second communication station to the first communication station, wherein the optical relay device further comprises: a first conductive layer, comprising a first power supply end and a plurality of interconnected first connection units connected to the first power supply end; and a second conductive layer, comprising a second power supply end and a plurality of interconnected second connection units connected to the second power supply end; wherein the light emitter is provided with a first pole and a second pole, the first pole of the light emitter in the light emitting unit is connected to the first connection unit, and the second pole of the light emitter in the light emitting unit is connected to the second connection unit; the light emitting units, the first connection units and the second connection units are in one-to-one correspondence in a connecting relationship; and the first conductive layer, the second conductive layer, and the light emitting unit correspondingly connected to the first conductive layer and the second conductive layer are provided on a same side of the substrate; or the optical relay device further comprises: a first conductive layer, comprising a plurality of first connection units arranged at intervals, wherein the first connection unit comprises a first power supply end; and a second conductive layer, comprising a plurality of second connection units arranged at intervals, wherein the second connection unit comprises a second power supply end; wherein the light emitter is provided with a first pole and a second pole, the first pole of the light emitter in the light emitting unit is connected to the first connection unit, and the second pole of the light emitter in the light emitting unit is connected to the second connection unit; the light emitting units, the first connection units and the second connection units are in one-to-one correspondence in a connecting relationship; and the first conductive layer, the second conductive layer, and the light emitting unit correspondingly connected to the first conductive layer and the second conductive layer are provided on a same side of the substrate.

17. The signal transmission system according to claim 16, wherein the signal transmission system further comprises a first signal processing portion and a second signal processing portion, wherein the first signal processing portion is configured to collect an electrical signal output by the communication station, and output the electrical signal to the optical relay device after filtering, amplifying and digitizing the electrical signal; and the second signal processing portion is configured to receive an electrical signal output by the optical relay device and output the electrical signal after modulating the electrical signal.

18. A method for manufacturing an optical relay device, comprising:

providing a substrate, wherein the substrate has a first side and a second side opposite to each other in a direction substantially perpendicular to the substrate; and forming a first transmission module and a second transmission module on the substrate;

wherein the first transmission module and the second transmission module both comprises at least one light emitting unit and at least one light receiving unit, wherein the light emitting unit is configured to convert an electrical signal into an optical signal, the light receiving unit is configured to convert an optical signal into an electrical signal; the light emitting unit comprises at least one light emitter, and when the light emitting unit comprises at least two light emitters, the light emitters in the light emitting unit are connected in parallel; the light receiving unit comprises at least one light receiver, and when the light receiving unit comprises at least two light receivers, the light receivers in the light receiving unit are connected in parallel; wherein the light emitting unit in the first transmission module is provided on the first side of the substrate, and the light receiving unit in the first transmission module is provided on the second side of the substrate; and the light emitting unit in the second transmission module is provided on the second side of the substrate, and the light receiving unit in the second transmission module is provided on the first side of the substrate; and optical paths of light receiving units and optical paths of light emitting units are provided in one-to-one correspondence in the direction perpendicular to the substrate, and the light receiving unit and the light emitting unit that are corresponding to each other form a signal transmission channel, wherein the optical relay device further comprises: a first conductive layer, comprising a first power supply end and a plurality of interconnected first connection units connected to the first power supply end; and a second conductive layer, comprising a second power supply end and a plurality of interconnected second connection units connected to the second power supply end; wherein the light emitter is provided with a first pole and a second pole, the first pole of the light emitter in the light emitting unit is connected to the first connection unit, and the second pole of the light emitter in the light emitting unit is connected to the second connection unit; the light emitting units, the first connection units and the second connection units are in one-to-one correspondence in a connecting relationship; and the first conductive layer, the second conductive layer, and the light emitting unit correspondingly connected to the first conductive layer and the second conductive layer are provided on a same side of the substrate; or the optical relay device further comprises: a first conductive layer, comprising a plurality of first connection units arranged at intervals, wherein the first connection unit comprises a first power supply end; and a second conductive layer, comprising a plurality of second connection units arranged at intervals, wherein the second connection unit comprises a second power supply end; wherein the light emitter is provided with a first pole and a second pole, the first pole of the light emitter in the light emitting unit is connected to the first connection unit, and the second pole of the light emitter in the light emitting unit is connected to the second connection unit; the light emitting units, the first connection units and the second connection units are in one-to-one correspondence in a connecting relationship; and the first conductive layer, the second conductive layer, and the light emitting unit correspondingly connected to the first conductive layer and the second conductive layer are provided on a same side of the substrate.

* * * * *